(12) United States Patent
Kinley

(10) Patent No.: US 8,471,187 B2
(45) Date of Patent: Jun. 25, 2013

(54) TWO-STAGE SOLAR CONCENTRATING SYSTEM

(75) Inventor: Peter J. Kinley, Lunenburg (CA)

(73) Assignee: Lunenburg Foundry & Engineering Limited, Lunenburg, Nova Scotia (CA)

( * ) Notice: Subject to any disclaimer, the term of this patent is extended or adjusted under 35 U.S.C. 154(b) by 1056 days.

(21) Appl. No.: 12/294,600

(22) PCT Filed: Oct. 5, 2007

(86) PCT No.: PCT/CA2007/001770
§ 371 (c)(1),
(2), (4) Date: May 7, 2009

(87) PCT Pub. No.: WO2008/046187
PCT Pub. Date: Apr. 24, 2008

(65) Prior Publication Data
US 2011/0259318 A1 Oct. 27, 2011

(30) Foreign Application Priority Data
Oct. 5, 2006 (CA) .................................... 2562615

(51) Int. Cl.
*G01J 1/20* (2006.01)
(52) U.S. Cl.
USPC ... 250/203.4; 60/641.8; 60/641.9; 60/641.11; 126/569; 126/571; 126/600; 126/682; 126/696
(58) Field of Classification Search
USPC .............. 250/203.4; 60/641.8, 641.9, 641.11; 126/569, 571, 600, 681, 682, 684, 688–690, 126/696
See application file for complete search history.

(56) References Cited

U.S. PATENT DOCUMENTS

| 2,803,591 A | 8/1957 | Coanda et al. |
| 3,118,437 A * | 1/1964 | Hunt ............................. 126/600 |
| 3,797,476 A | 3/1974 | Tarcici |

(Continued)

FOREIGN PATENT DOCUMENTS

| GB | 2 176 022 | 12/1986 |
| WO | 2005022047 | 3/2005 |

OTHER PUBLICATIONS

International Search Report for related PCT Application No. PCT/CA/001770.
Written Opinion for related PCT Application No. PCT/CA/001770.

*Primary Examiner* — Georgia Y Epps
*Assistant Examiner* — Kevin Wyatt
(74) *Attorney, Agent, or Firm* — McDermott Will & Emery LLP

(57) ABSTRACT

An improved solar concentrating system (100) uses a two-stage arrangement of mirrors wherein the rays of the sun are reflected and concentrated to a point focus. The solar concentrator (100) may be used to increase the temperature of a substance such as metal, for use in a variety of applications including the melting of metals in a foundry furnace. The solar concentrating system (100) comprises at least two single-curved parabolic mirrors (10, 20) connected in an operable arrangement. The rays of the sun are reflected from a first single-curved parabolic mirror (10) to a second single-curved parabolic mirror (20). The plane of symmetry of the second single-curved parabolic mirror is arranged substantially orthogonal to the plane of symmetry of the first single-curved parabolic mirror thereby concentrating the rays of the sun to a point focus.

17 Claims, 34 Drawing Sheets

U.S. PATENT DOCUMENTS

| | | | | |
|---|---|---|---|---|
| 3,905,352 A * | 9/1975 | Jahn | | 126/578 |
| 4,133,150 A * | 1/1979 | Yacoboni | | 52/81.2 |
| 4,191,164 A * | 3/1980 | Kelly | | 126/683 |
| 4,266,179 A | 5/1981 | Hamm | | |
| 4,281,640 A | 8/1981 | Wells | | |
| 4,408,595 A * | 10/1983 | Broyles et al. | | 126/600 |
| 4,439,020 A | 3/1984 | Maruko | | |
| 4,784,700 A * | 11/1988 | Stern et al. | | 136/248 |
| 5,374,317 A | 12/1994 | Lamb et al. | | |
| 5,658,448 A * | 8/1997 | Lasich | | 205/628 |
| 6,022,114 A | 2/2000 | Foo | | |
| 6,302,099 B1 * | 10/2001 | McDermott | | 126/600 |
| 6,530,369 B1 | 3/2003 | Yogev et al. | | |
| 6,811,271 B2 | 11/2004 | Hayakawa et al. | | |
| 6,953,038 B1 * | 10/2005 | Nohrig | | 126/694 |
| 7,138,960 B2 * | 11/2006 | Carroll et al. | | 343/882 |
| 7,337,843 B2 * | 3/2008 | Mecham et al. | | 166/302 |
| 2006/0201498 A1 * | 9/2006 | Olsson et al. | | 126/605 |
| 2006/0225729 A1 * | 10/2006 | Litwin | | 126/573 |

* cited by examiner

TWO-STAGE SOLAR CONCENTRATING SYSTEM

FIELD OF INVENTION

The present invention relates to a solar concentrator. In particular, the present invention relates to a two-stage solar concentrating system wherein the rays of the sun may be reflected and concentrated to a desired focus—optionally, a square focus. More particularly, the present invention relates to a two-stage solar concentrating system wherein the rays of the sun are reflected and concentrated to a point focus. Such a solar concentrator may be used to increase the temperature of a substance such as, for example, metal, for use in a variety of applications including, inter alia, melting of metals in a foundry.

BACKGROUND OF THE INVENTION

As the world-wide demand for energy increases exponentially, there is a heavy burden placed on traditional sources of energy, such as non-renewable fossil-based fuels. The price of crude oil has shown significant historical fluctuations. The spiraling cost of crude oil in recent years adversely effects the bottom-line of many small and medium scale energy-intensive industries such as foundries and the like. Therefore, alternate sources of energy, e.g., solar power, have become increasingly attractive in recent times. There is an environmental benefit to adopting cleaner energy sources as reduction of burning of fossil fuels helps to reduce greenhouse gas emissions Solar energy technology has developed significantly since the ancient Greek civilization learned the art of concentrating sun's rays. Over the years, solar energy research has helped develop systems that have improved efficiency and are more economical. However, a dearth of information, materials, complexity, and manufacturing skills remain an impediment to large-scale production and utilization of this abundantly available energy source.

Solar concentrators are characterized and classified based on several criteria including the means of concentration: reflection or refraction; type of focusing: point, line, or non-focusing; type of concentrator: fixed or tracking concentrator; and, type of receiver: fixed or tracking receiver.

As will be described and illustrated hereinafter, there are three primary types of reflective solar concentrating systems based on the type of focusing they produce, viz., (a) parabolic trough concentrators that produce line focus; (b) central receiver-type concentrators that concentrate sunlight onto distant and centralized towers; and, (c) parabolic dish concentrators that produce a point focus.

Based on the end application, the different types of solar concentrators are employed to achieve optimum results. For example, the parabolic trough concentrators are employed to produce electricity and heat. However, troughs have a low maximum solar concentration, high receiver heat loss, and are expensive. Central receiver-type concentrators are typically employed in large scale applications for electricity generation and require vast real-estate for proper deployment and are thus not economical for small and medium-scale industries. On the other hand, parabolic dish concentrators are highly efficient in concentrating the sun's rays. The biggest impediment to parabolic dish concentrators include, inter alia, the prohibitive costs associated with compound and complex reflector curves and expensive mirror substrates.

In a typical solar concentrating system used in furnace applications, a high energy density solar radiation is provided to a target receiver, thus raising the temperature of the target. Depending on the degree of concentration, the optical properties (solar absorption and radiation) of the target surface, the system may be utilized to melt a target surface, thus forming a solar furnace.

Over the years attempts have been made to design and construct solar concentrators that provide point focus (high solar concentration) with minimum complexity and cost. U.S. Pat. No. 5,374,317 (Lamb et al.) discloses a multiple reflector concentrator solar electric power system. In this system, the sun's rays first reach a plane of individual primary reflectors (which may be flat or curved). The primary reflectors then reflect the solar radiation to the location of secondary reflectors (which may again be flat or curved) and are then passed through to the photovoltaic component. The system disclosed by Lamb et al. uses a large number of components other than primary and secondary reflectors such as tertiary reflectors, optional cover plates, and heat dissipation components particularly suited for solar power generation. This results in a system that is complex and expensive.

U.S. Pat. No. 6,530,369 (Yogev et al.) also describes a system comprising two reflectors that are successively arranged along an optical path of the system so that the first of the two reflectors reflects the radiation towards the second reflector. The concentrated radiation from the second reflector is directed to a solar receiver. However, the second reflector is realized as a tower reflector. As discussed earlier, central receiver-type concentrators are typically employed in large scale applications for electricity generation and require vast real-estate for proper deployment and are thus not economical for small and medium-scale industries.

International Patent Publication No. WO 2005/022047 A2 (Shifman) discloses a solar energy utilization unit comprising a solar radiation concentrating component and a solar energy receiving component. The concentrating component comprises a concave primary reflector and a convex secondary reflector, for concentrating incident solar radiation and forwarding the concentrated radiation into the receiving component. However, the reflectors are dish-shaped and require high precision curved surfaces for obtaining proper concentration effects.

U.S. Pat. No. 4,784,700 (Stern et al.) describes a point focus solar concentrator which uses various geometries of cylindrical reflector strips as primary and secondary reflectors to simulate a point focus by overlapping the line foci of each segment at a coincident point. Although, the Stern et al. device uses cylindrical rather than dish-shaped parabolic mirrors that are easier to form and polish since they have a simple curvature, the arrangement of the reflector strips in a Fresnel-type mirror arrangement requires high manufacturing skills and therefore increases its cost.

U.S. Pat. No. 3,118,437 (Hunt) discloses a system of two reflective surfaces or two sets of reflective surfaces facing each other in an arrangement that causes all rays striking the first reflective surface to converge onto a substantially one point or limited area. Although Hunt discusses a system of two reflective surfaces, wherein the effective axes of curvature of a second surface or set of surfaces are being normal to the effective axes of curvature of the first surface or set of surfaces, the practical embodiments of Hunt's reflective system are complex and require elaborate infrastructure, such as, for example, carriages and tracks.

There is accordingly a need for an improved solar concentrating system that overcomes the limitations associated with using complex construction requiring high degree of skills. Moreover, there is a need for an improved solar concentrating system wherein the prohibitive costs associated with manufacture and deployment of a traditional solar concentrating system are minimized thereby making it attractive for use by small and medium scale energy-intensive industries.

SUMMARY OF THE INVENTION

An object of the present invention is thus to provide an improved solar concentrating system using a two-stage construction wherein the rays of the sun are reflected and concentrated to a point focus. Such a solar concentrator may be used to increase the temperature of a substance such as metal, for use in a variety of applications including melting of metals in a foundry furnace.

According to an aspect of the present invention, there is provided, a solar radiation concentrating system comprising: a first single-curved reflective surface and a second single-curved reflective surface, said system including a mounting structure associated therewith, said mounting structure being so arranged as to cause variance between said first and second curved reflective surface, wherein the rays of the sun are reflected from the first single-curved reflective surface to the second single-curved reflective surface, and wherein the principal plane of symmetry of the first reflective surface is arranged substantially orthogonal to the principal plane of symmetry of the second reflective surface, thereby concentrating the rays of the sun to a point focus.

According to another aspect of the present invention, there is provided, a solar radiation concentrating system comprising: one or more than one first single-curved reflective surface and one or more than one second single-curved reflective surface; and a mounting structure, the mounting structure comprising: a platform; and a primary and secondary boom mounted to the platform, wherein the primary boom and the secondary boom are hingedly attached so as the angle between the first and second boom be varied and, wherein the principal plane of symmetry of the first reflective surface is arranged substantially orthogonal to the principal plane of symmetry of the second reflective surface.

The first single-curved reflective surface has a focal length greater than that of the second single-curved reflective surface.

In one embodiment of the present invention the first and second reflective surfaces are parabolic cylinders.

In another embodiment of the present invention, the single-curved reflective surfaces are mounted on a support frame. The support frame may be made of wood, steel, aluminum, thermoplastic, composite materials, bronze alloy, copper based alloy or other synthetic material.

In a preferred embodiment of the present invention the support frame comprises means for accommodating the reflecting surface, means for changing the curvature of the reflective surface, or both thereof. In still another preferred embodiment of the present invention the support frame comprises fasteners, stiffeners, braces, or combinations thereof to maintain the shape of the reflective surface and for preventing gravitational sag.

In still another preferred embodiment of the present invention the reflective surface is made from polished stainless steel, mirrored glass, polyester film (PET) sheets, preferably coated with aluminum or synthetic material having a suitable refractive index so that it may be effectively used for the mirror surfaces, or combinations thereof.

In still another preferred embodiment of the present invention the mounting structure comprises a support member for each reflective surface, wherein the support member is provided with tilting means to adjust its tilt angle. The support member preferably comprises a sliding mechanism engaged with and movable along the first and secondary boom.

In still another preferred embodiment of the present invention the solar radiation concentrating system comprises a tilt angle adjusting means and a folding and deploying means. Preferably the tilt angle adjusting means comprises one or more winch & pulley mechanisms, gear trains, hydraulic cylinders, or combinations thereof. Preferably, the folding and deploying means comprises one or more hydraulic cylinders or threaded rods for effecting movement of the sliding mechanism, folding or deploying the mounting structure, or combinations thereof.

In still another preferred embodiment of the present invention a tension wire, chain, or rope and a pulley are used to adjust the tilt angle of the reflective surfaces in connection with the support member.

In still another preferred embodiment of the present invention the solar radiation concentrating system comprises solar tracking means for tracking the sun and maintaining the focus on a desired position. The solar tracking means may comprise wedges, hinges, castors, rails, bearings, foundation mounts, etc. and may be actuated manually or by electric or hydraulic motors and associated control devices.

In still another preferred embodiment of the present invention the mounting structure sits on a trailer for ease of transportation. The trailer preferably, but not limited to, comprises a trailer chassis, a plurality of wheel supports attached to the trailer chassis, a ground engaging wheel rotatably mounted to each of the wheel supports, and a drawbar attached to the trailer and projecting outwardly therefrom to a free end carrying a trailer hitch adapted to be hitched to a tow bar for towing the trailer chassis behind a vehicle.

According to an aspect of the present invention, there is provided a method for concentrating radiation to a coincident focus comprising reflecting an incident radiation off a first single-curved reflective surface onto a second single-curved reflective surface, wherein the principal plane of symmetry of the first single-curved reflective surface is arranged substantially orthogonal to the principal plane of symmetry of the second single-curved reflective, whereby the second single-curved reflective surface concentrates the incident radiation to the focus and wherein the first and second reflective surfaces are interconnected by a mounting structure the mounting structure comprising: a platform or base; and a primary boom, or a primary boom and secondary boom operably associated with the platform, wherein the primary boom and the secondary boom are adapted for operable attachment, whereby the angles between the first and second boom, and base may be selectively varied.

According to another aspect of the present invention there is provided a method for concentrating radiation to a substantially rectangular, cross sectional area comprising reflecting an incident radiation off a first single-curved reflective surface onto a second single-curved reflective surface, wherein the principal plane of symmetry of the first single-curved reflective surface is arranged substantially orthogonal to the principal plane of symmetry of the second single-curved reflective, whereby the second single-curved reflective surface concentrates the incident radiation to the focus and wherein the substantially rectangular, cross sectional area is defined by a plane orthogonal to the principal axis of the second single-curved reflective surface at an intermediate point between a vertex and the focus of the second reflective surface and wherein the first and second reflective surfaces are interconnected by a mounting structure the mounting structure comprising: a platform, or base; and a primary boom, or a primary boom and secondary boom operably associated with the platform, wherein the primary boom and the secondary boom are adapted for operable attachment, whereby the angles between the first and second boom, and base may be selectively varied.

According to yet another aspect of the present invention there is provided A method for concentrating radiation to a substantially rectangular, cross sectional area comprising reflecting an incident radiation off a first single-curved reflective surface onto a second single-curved reflective surface, wherein the principal plane of symmetry of the first single-curved reflective surface is arranged substantially orthogonal to the principal plane of symmetry of the second single-curved reflective, whereby the second single-curved reflective surface concentrates the incident radiation to the focus and wherein the substantially rectangular, cross sectional area is defined by a plane orthogonal to the principal axis of the second single-curved reflective surface at a point situated after the focus of the second reflective surface and wherein the first and second reflective surfaces are interconnected by a mounting structure the mounting structure comprising:
a platform or base; and a primary boom, or a primary boom and secondary boom operably associated with the platform, wherein the primary boom and the secondary boom are adapted for operable attachment, whereby the angles between the first and second boom, and base may be selectively varied.

According to another aspect of the present invention, there is provided a method for forming single-curved mirrors from polished sheets comprising bending the polished sheets into a single-curved shape and supporting the bent polished sheets in the single-curved shape by support frames for use in a solar concentrating system. In other preferred embodiments the reflective surfaces may be formed into a curve, preferably a parabolic curve, by applying opposite compression forces at the ends thereof, the compression forces may be applied by using, for example, tension wires. In another preferred embodiment the reflective surfaces may be formed into a curve by means of, for example, curved slots. In still another preferred embodiment the reflective surface may be formed into a curve using gravity sag. When silvered mylar is used, the reflective surface may be formed into a curve, for example, by slinging the silvered mylar sheet by cords from supports at each end thereof (catenary method).

According to a further aspect of the present invention, there is provided a solar concentrating kit comprising at least two single-curved parabolic mirrors and a corresponding number of support frames and, optionally, a mounting structure.

BRIEF DESCRIPTION OF THE DRAWINGS

Embodiments of the present invention will be further described with reference to the accompanying drawings, in which.

DETAILED DESCRIPTION OF THE INVENTION

Figure 1:
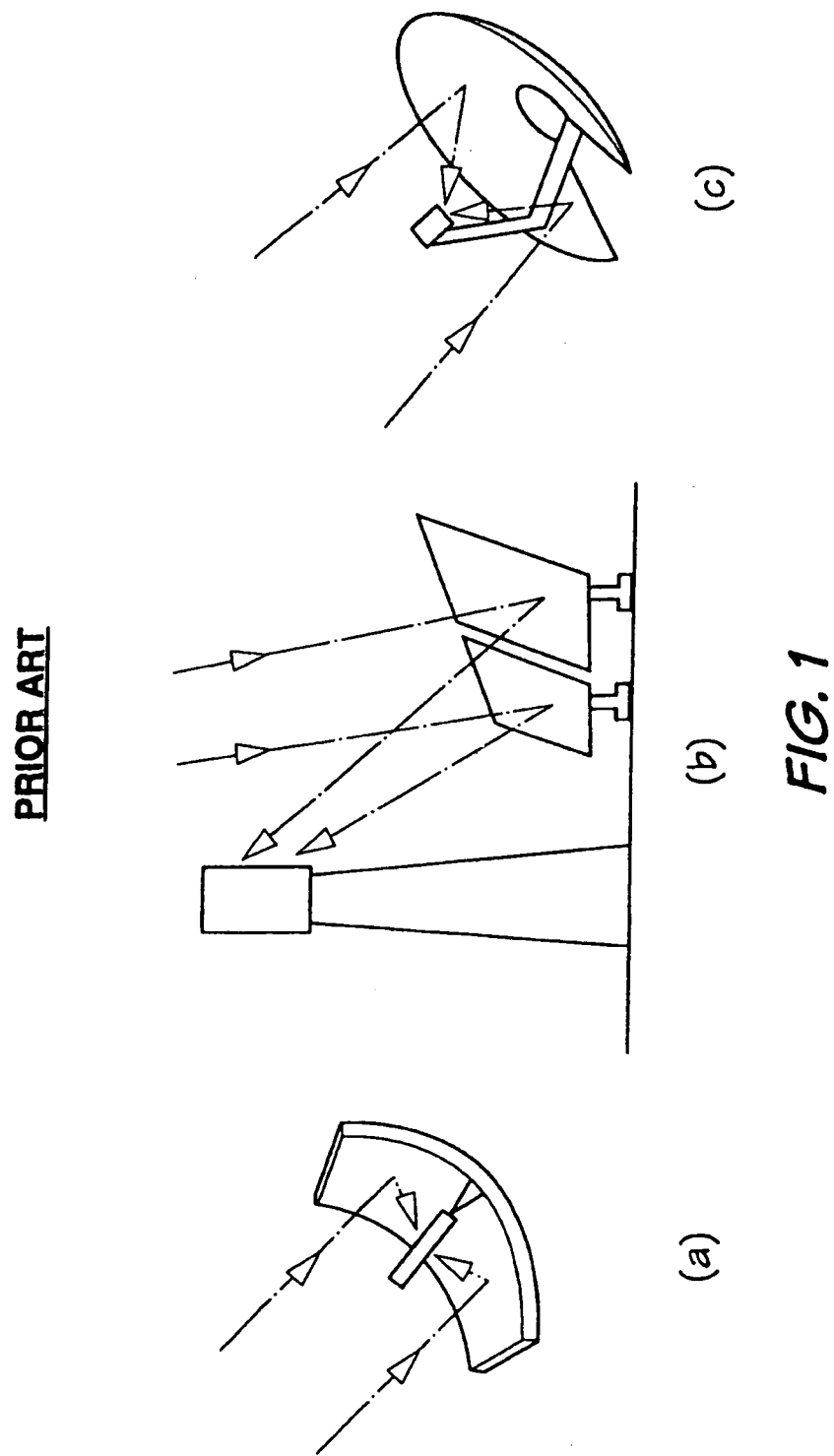
FIG. 1 is a representation of different types of conventional solar concentrating systems based on the type of focusing; (a) parabolic trough concentrator; (b) central receiver concentrator; and (c) parabolic dish concentrator.

FIG. 1 shows three primary types of reflective solar concentrating systems based on the type of focusing they produce, viz., (a) parabolic trough concentrators that produce line focus; (b) central receiver-type concentrators that concentrate sunlight onto distant and centralized towers; and, (c) parabolic dish concentrators that produce a point focus.

Figure 2:
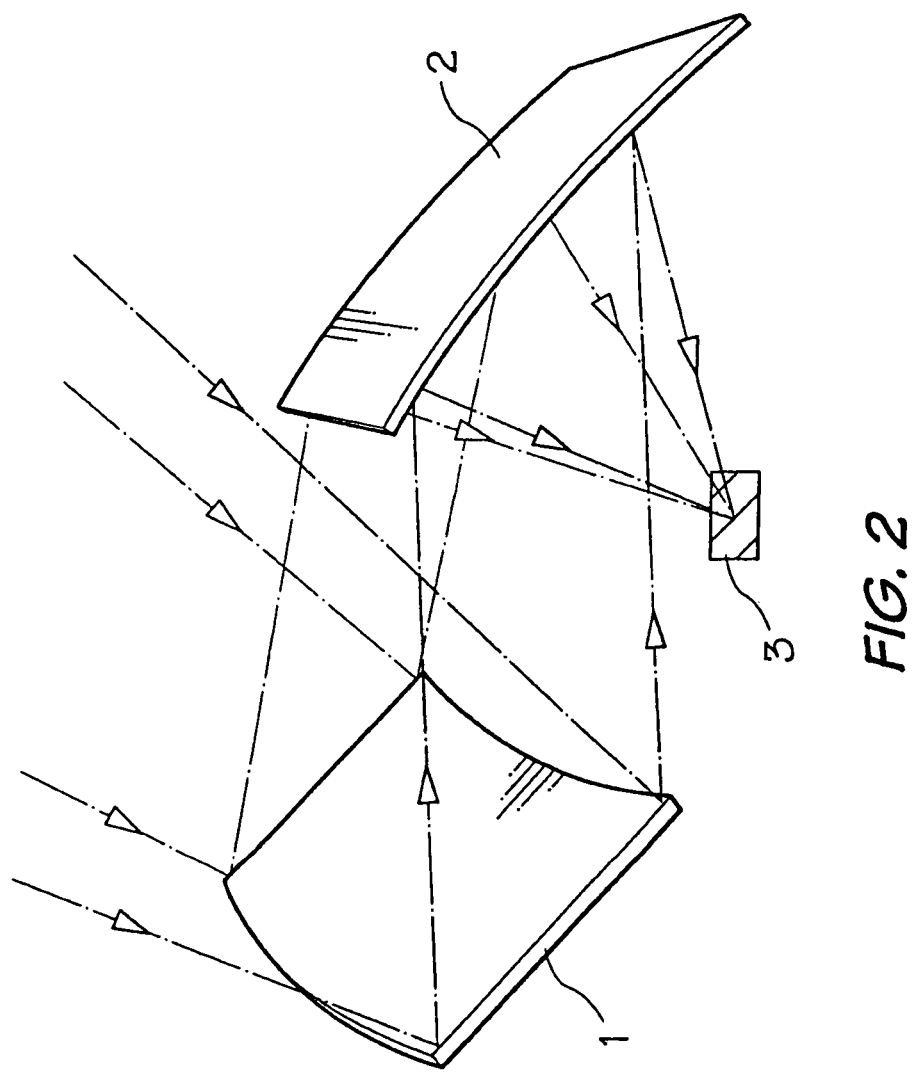
FIG. 2 is a ray diagram illustrating the principle of a two sheet mirror solar concentrating system.

The underlying principle of a two-stage solar concentrating system is illustrated in FIG. 2. A two-stage solar concentrating system comprises two single-curved mirrors (1, 2) curved in a parabolic shape so that the rays of the sun are reflected and concentrated to a point focus at a location (3). The two mirrors have two different focal lengths. The primary mirror (1) has a long focal length and the secondary mirror (2) has a short focal length. The rays of the sun are concentrated to a line focus by the primary mirror (1). The secondary mirror (2), with its plane of symmetry substantially orthogonal to that of the primary mirror (1), then intersects and concentrates the reflection from the primary mirror (1) so that the total reflected rays converge to a point focus at the target location (3). The secondary mirror (2) is located a distance away from the focal point of the primary mirror (1) that is equal to focal length of the secondary mirror (2).

Figure 3:
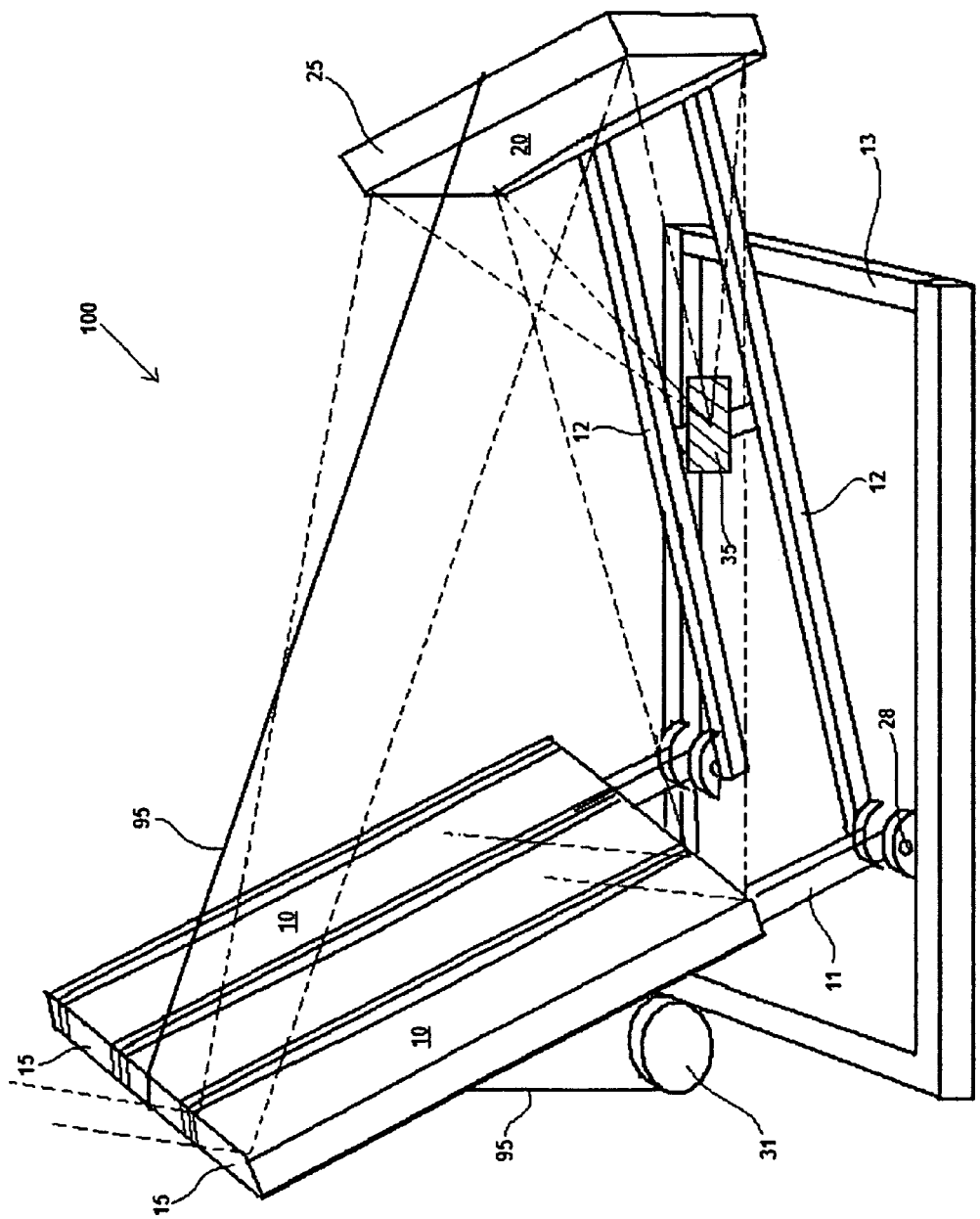
FIG. 3 is a schematic representation of an embodiment of the two-stage solar concentrating system according to the present invention.

FIG. 3 shows an exemplary embodiment of the two-stage solar concentrating system (100) according to the present invention. A first sheet mirror and a second sheet mirror are bent/curved into first and second single-curved parabolic mirrors (10, 20) by a first support frame (15) and a second support frame (25), respectively. The support frames (15, 25) are constructed such that the focal length of the first single-curved parabolic mirror (10) is longer than focal length of the second single-curved parabolic mirror (20). The second single-curved parabolic mirror (20) is located at a distance equal to its focal length in front of the point of focus (line focus) of the first single-curved parabolic mirror (10) so as to maximize the incidence of the reflected radiation from the first single-curved parabolic mirror (10). The rays of the sun (shown by dashed lines) are concentrated to a line focus by the first single-curved parabolic mirror (10). The second single-curved parabolic mirror (20), with its plane of symmetry substantially orthogonal to that of the first single-curved parabolic mirror (10), intersects and concentrates the reflection from the first single-curved parabolic mirror (10) to a point focus in the vicinity of a target (35). The first and second support frame (15, 25) may be mounted on a solar tracking means, such as heliostats, to maintain orientation with the sun over time (not shown). In a preferred embodiment the first and second support frame (15, 25) are made of wood, steel, aluminum, plastic, composite materials, bronze alloy, copper based alloy, or combinations thereof. The first and second support frame (15, 25) may comprise means for accommodating the first and second single-curved parabolic mirrors (10, 20), means for changing the curvature of the first and second single-curved parabolic mirrors (10, 20), or both thereof. In a preferred embodiment the support frames (15, 25) comprise fasteners, stiffeners, braces, curved slots, or combinations thereof for controlling the curvature of the mirrors and for preventing gravitational sag. In still a preferred embodiment of the two-stage solar concentrating system according to the present invention the first and second support frame (15, 25) may be mounted each on primary and secondary booms (11) and (12), respectively. The primary and secondary boom (11, 12) may be, optionally, mounted to a platform (13). However, the primary and secondary boom (11, 12) may be supported by any other supporting structure envisaged by a skilled artisan. The primary and secondary boom (11, 12) are attached, optionally, by means of a hinge mount (28) so as the angles between the first and second boom (11, 12) and the platform (13) be selectively varied so as to track the rays of the sun and keep the point focus on the target (35). Any means for manual and/or automatic variance of the angle between the first and second boom (11, 12) may be used, optionally, operably connected with sun tracking means and/or indicia, to cause adjustment of the relative position of the mirrors with respect to each other and the sun so as to produce a coincident and/or a square focus according to the present invention. In the embodiment illustrated in FIG. 3, the first single-curved parabolic mirror (10) is shown to have its plane of symmetry substantially parallel to the ground while the second single-curved parabolic mirror (20) is shown to have its plane of symmetry substantially orthogonal to the ground. However, any other orientation of the two mirrors may be employed as long as the planes of symmetries of the two mirrors are substantially orthogonal to each other and the second single-curved parabolic mirror (20) receives and further concentrates the sun rays reflected from the first single-curved parabolic mirror (10) to a point focus in the vicinity of the target (35).

The size (area) of the first single-curved parabolic mirror may be chosen in accordance with the amount of energy needed. The continuous curved mirror surfaces of the two-stage solar concentrating system according to the present invention yield a very hot point focus. For example, a 4 ft (width)×8 ft (height) first single-curved parabolic mirror (10) and an 8 ft (width)×4 ft (height) second single-curved parabolic mirror (20) arranged in accordance with the present invention, resulted in a 4 in×4 in square focus area providing a concentration ratio of approximately 300:1. The highest temperature recorded was 542° C. This temperature was sufficient to melt Babbitt metal.

In another embodiment of the present invention, a plurality of first (primary) and second (secondary) single-curved mirrors may be employed to increase the concentration of solar energy. In an exemplary embodiment FIG. 3 shows three first (primary) single-curved mirrors (10) with support frames (15) and one second (secondary) single-curved mirror (20) with support frame (25). However, it is to be understood that the number of primary and/or secondary mirrors may be suitably adapted, by a person skilled in the field pertaining to the present invention, so as to fit specific applications of the two-stage solar concentrating system. However, it is to be understood that the underlying optical principle of concentrating the sun rays with use of a two-stage arrangement of mirrors remains the same. For example, a number of primary mirrors may be arranged to focus through a single secondary mirror thereby increasing the effective concentration ratio. The plurality of primary mirrors may be mounted on a supporting frame and made to track the sun directly as a single unit in order to cast their combined reflection on a secondary mirror and then onto a point focus. Alternatively, the secondary mirror may also be mounted on the supporting frame together with the primary mirrors. Additionally, different combinations of focal lengths of the primary and secondary mirrors may also be employed. The solar collector can be multi-purpose. That is more than one receiver can be mounted so that the concentrated beam may be redirected simply by changing the angle of the secondary mirror. Different receivers can be installed for different purposes, such as: melting, steam generation, heat extraction, electrical generation, cooking, or others. Each receiver would have a standard mount so that they would be modular. Different receivers may be plugged in to the apparatus thus changing its application.

Furthermore, due to mirror aberration and/or mirror irregularities, there may be a hot spot near the middle of the focus area while peripheral areas are cooler. The depth of the focus field may also be varied with different mirror arrangements. For example, there may be a warm spot before the focus, a hot spot in the center of the focus and a relatively cooler spot after the focus. Thus, the temperature of the target may be controlled by locating the target slightly off the point focus of the two-stage solar concentrating system. Multiple mirror systems may spread the energy to a number of targets within the same apparatus. Tertiary focusing mirrors may also be employed to increase the focus. An example of a tertiary focusing mirror is an internally mirrored cone or a parabolic dish concentrator.

In the example described earlier, polished-20-gauge stainless steel sheets were used to form the continuously curved cylindrical parabolic mirrors (10, 20). Other materials such as mirrored glass, Silvered Mylar™ or polyester film (PET) sheets, preferably coated with aluminum or synthetic material having a suitable refractive index so that it may be effectively used for the mirror surfaces.

Figure 6:
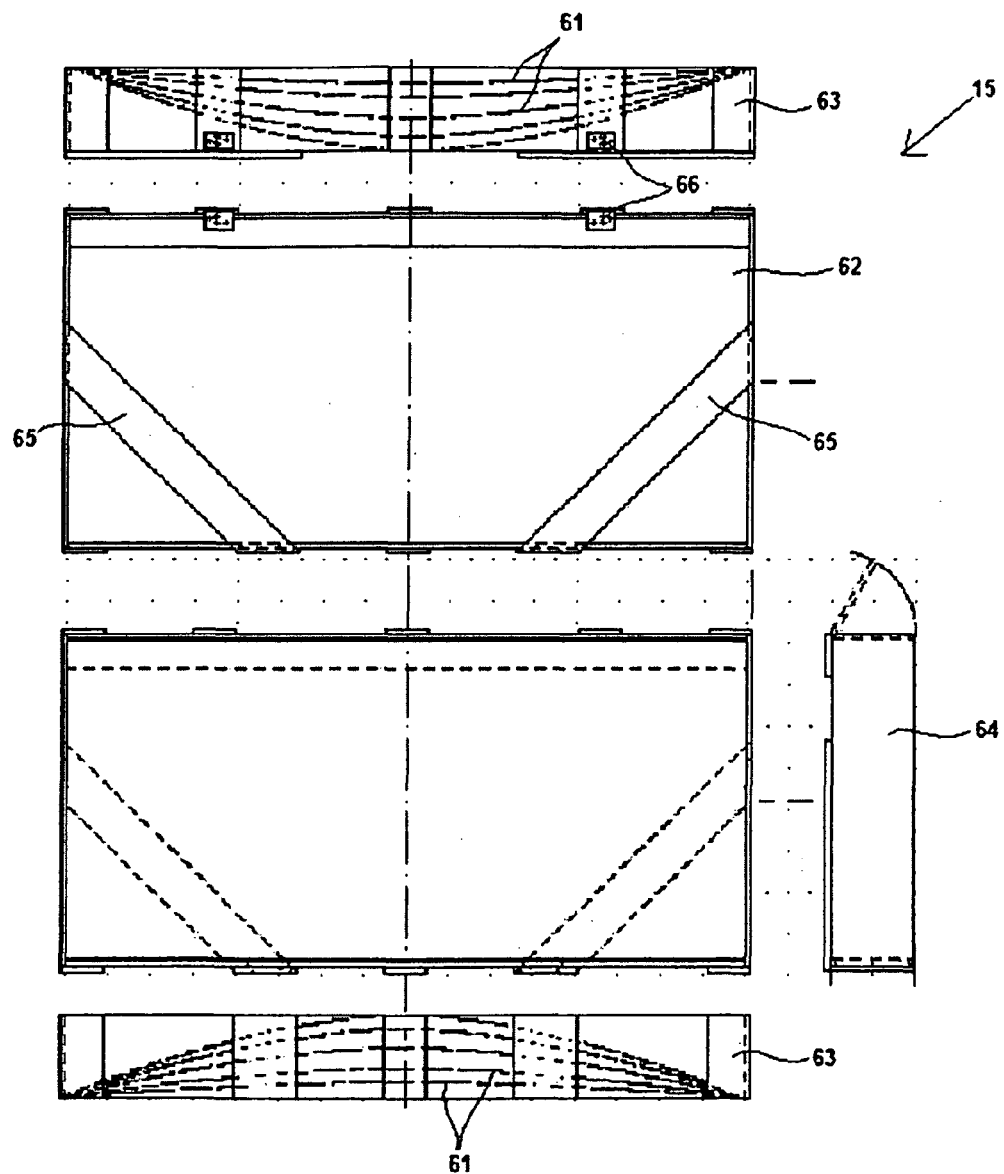
FIG. 6 is a schematic representation of an example of a frame support according to the present invention.

The first and second support frame (15, 25) were made from plywood frame in the experimental example (see FIG. 6). However, frames using aluminum extrusions, wood, steel, plastic, or other suitable natural and synthetic material may also be used. The mirrors are held in a cylindrical parabolic shape by inserting the two opposing edges of the mirror sheets (usually the long sides) into a curved slot (61) provided in a side panel (63) of the support frame (15). The support frame may have separate slot holders that are independent of the support frame for changing the curvature of the mirror surfaces. Additional braces may be employed for preventing gravitational sag and to maintain proper cylindrical parabolic form of the mirrors. The support frame may be made up of simple beam elements, or may be combined into a truss-like structure. FIG. 6 shows an example of a support structure (15) with adjustable focal length made of plywood. The support structure is made of a back panel (62), side panels (63) and top and bottom panels (64). The side panels (63) are provided with separate slotted holders that are independent of the support frame (15) so as to allow adjustment of the curvature of the reflective sheet. Other braces may be employed to keep the ruled surface elements straight to prevent gravitational sag and maintain the cylindrical form of the reflective sheet. For example, diagonal braces (65) are provided on the back panel for support. In addition, hinges (66) may be provided to allow relocation of the reflective sheet. It is to be noted that the main consideration in the construction of the support frame is that it should be strong enough to support the weight of the mirrors as well as possible wind loads to maintain the desired alignment.

Figure 4:
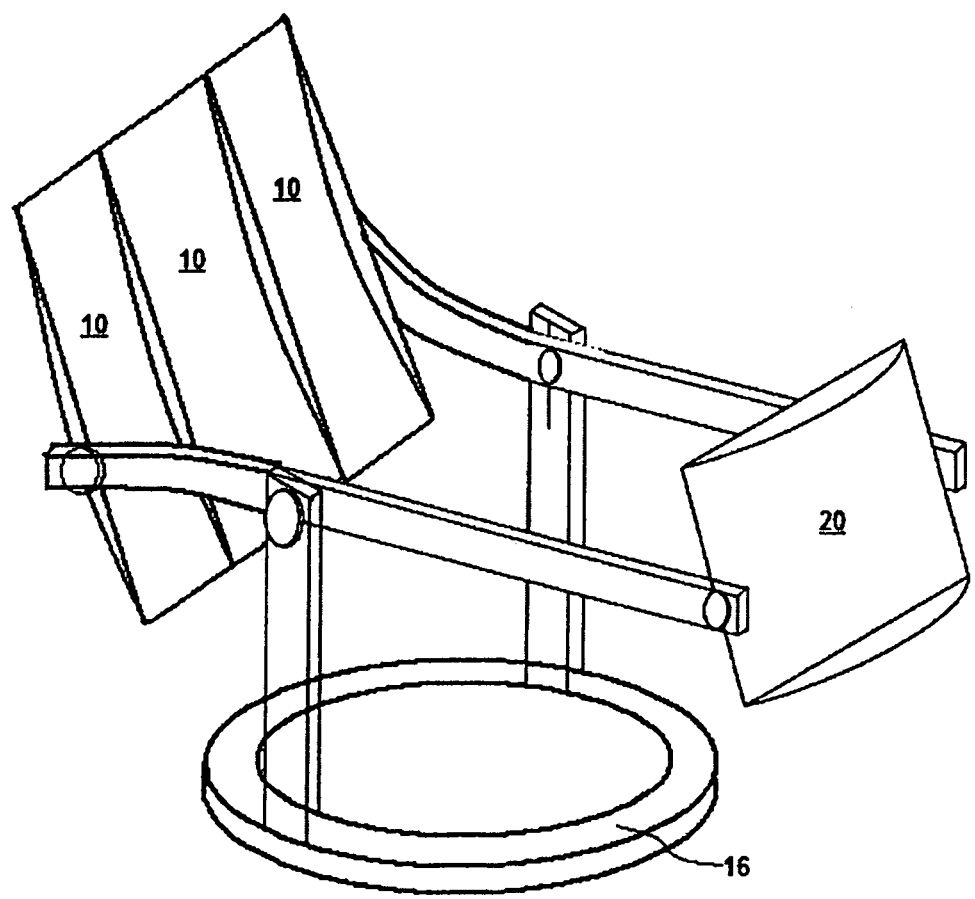
FIG. 4 is a schematic representation of another embodiment of the two-stage solar concentrating system according to the present invention.

FIG. 4 shows an exemplary embodiment of a truss-like structure, wherein a plurality of first single-curved mirrors (10) and a second single-curved mirror (20) are mounted on a ring base (16). As shown in FIG. 4 the truss-like structure may comprise means for adjusting the relative position of the single-curved mirrors (10, 20) as well as means for retaining the mirrors in the desired position. Other embodiments may be envisaged featuring, inter alia, high hinge mount and balance beam boom connecting primary and secondary mirrors.

The two-stage solar concentration system according to the present invention may further comprise solar tracking means to adjust the orientation of the system to correspond with local height and direction of sun at a particular time. The tracking means may comprise wedges, hinges, castors, rails, bearings, foundation mounts, etc. and may be actuated manually or by electric or hydraulic apparatus and associated control devices.

Figure 5:
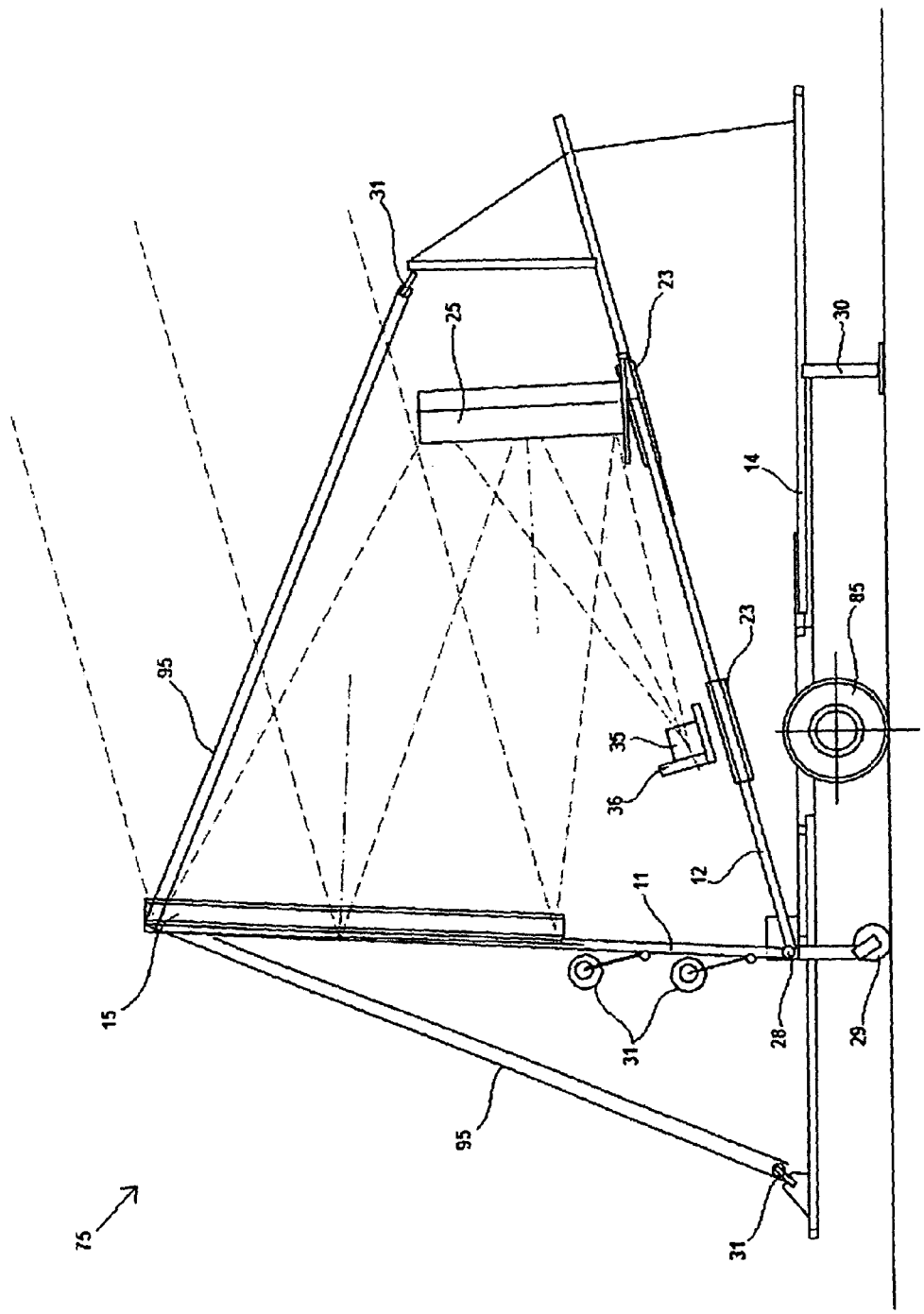
FIG. 5 is a schematic representation of an example of a two-stage solar concentrating system according to the present invention mounted on a trailer.

Another embodiment of the two-stage solar concentrating system according to the present invention mounted on a trailer (75) is illustrated in FIG. 5. The trailer (75) may be fitted with a pivot (30) and adjustable castors (29) and wheels (85) so that it may rotate sideways to track the sun through the day. Variance of the angles between the first boom (11) and the second boom (12) and between the booms (11, 12) and platform/base (14) as well as the pan and tilt angles of mirrors may be achieved by a combination of winch and pulley mechanism (31) operably interconnected to the frame support (15, 20) and the booms (11, 12) and the platform/base (14) by a tension wire, chain, or rope (95). The position of the first and second support frame (15, 20) may be adjusted along the boom (11, 12) by use of a sliding mechanism engaged with and slidable along the first and second boom (11, 12). In an exemplary embodiment the sliding mechanism employs a sliding carriage (23). In a similar manner the relative position of the receiver (36) containing the target (35), in respect of the first and second single-curved mirror (10, 20), may also be adjusted by use of a sliding mechanism or any other adjusting means known to a skilled artisan in the art pertaining to the present invention.

The tilt angle of mirrors may be adjusted through the day to provide desired focus arrangement. The individual elements of the two-stage solar concentrating system may be folded, stacked and packaged for transportation and erected in kit form for application in many different locations. The trailer mounted units may be towed to remote locations, unfolded and put into use.

Figure 7:
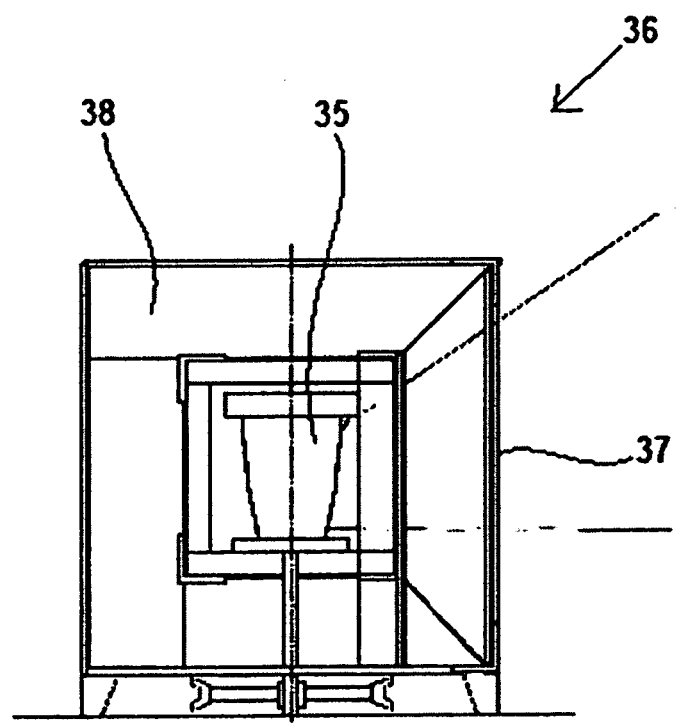
FIG. 7 is a cross-sectional view of a receiver/target according to the present invention.

An exemplary embodiment of a receiver (36) containing a melting pot or target (35) is shown in FIG. 7. The exemplary receiver (36) shown in FIG. 7 is shaped like a cube with one vertical side (37) being made from a transparent material such as, for example, $SiO_2$ or acrylic glass. The receiver (36) may have an insulation (38) purposed to minimize thermal exchange between the target and the environment. Any known insulation material may be used provided that the various technical aspects known to person skilled in the art such as the suitable thickness, reaction to high temperature, means for attaching the insulation material to the wall of the receiver, etc. are selected according to the design and purpose of the specific application of the solar concentrating system of the present invention. Different receiver and target designs should be applied for melting solids, boiling liquids, or for electrical production. Some targets may be vertical while others, horizontal as the top of a pot. Receivers may or may not: be insulated, have covers, be dish shaped, be movable or fixed and have valves for control.

Although the solar concentrating system described herein has been employed for concentrating solar energy for foundry applications, the system may be employed for several other applications. The applications of the two-sheet (cylindrical parabolic) mirror focusing system are many and varied for wherever and whatever heat energy is required. For example, the solar concentrating system may be employed for providing thermal energy to space heating, industrial processes, high temperature reduction of hazardous wastes, metal extrusion forming, roll forming, surface treatment, welding, fusing, annealing, or heat treatment of metals, and in petrochemical industries. Applications may include thermal industrial processes such as metal melting in foundry work for metal casting, melting scrap for recycling or reduction of ores in metal production. Units may be developed that serve the purpose of metal welding, brazing or soldering. It is envisioned that the solar concentrating system according to the present system may be useful for processing oil sands and shale into usable oil products with minimum emission of greenhouse gasses. It may be useful for production of synthetic fuels using solar photochemical and/or solar thermochemical processes and may include Hydrogen production. The two-sheet (cylindrical parabolic) mirror focusing system may be used for electrical production through a steam cycle generating system, Sterling heat engine or, photovoltaic electric generation systems. The two-sheet focusing system may be used for space heating, domestically (home heating), institutional or public space heating, whether the heat energy may be used right away or stored in a thermal storage device for later use and/or with heating ducts or thermal conduits to distribute the thermal energy across a distance to other locations. The two-sheet focusing system may be used for food processing, such as cooking or drying. Barbecue sized units could be developed for backyard applications on sunny days. The system may also be used in cremation facilities. The two-sheet focus might be taught to woodsmen or boy-scouts as a way to start a campfire. Small hand-held units might be developed to provide a sort of novelty cigarette lighter.

Figure 8:
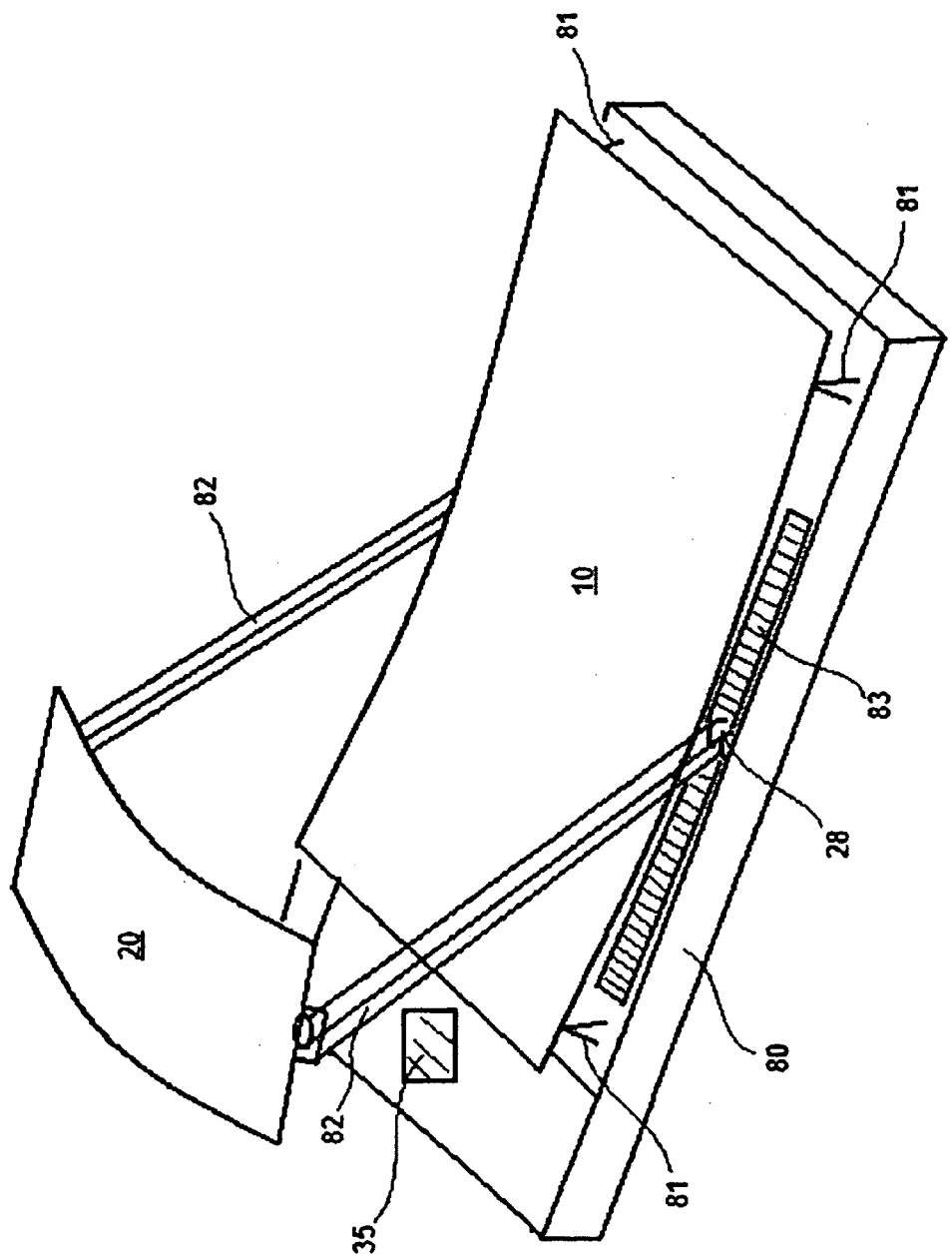
FIG. 8 is a schematic representation of an example of a two-stage solar concentrating system according to the present invention mounted on a watercraft.
Figure 9:
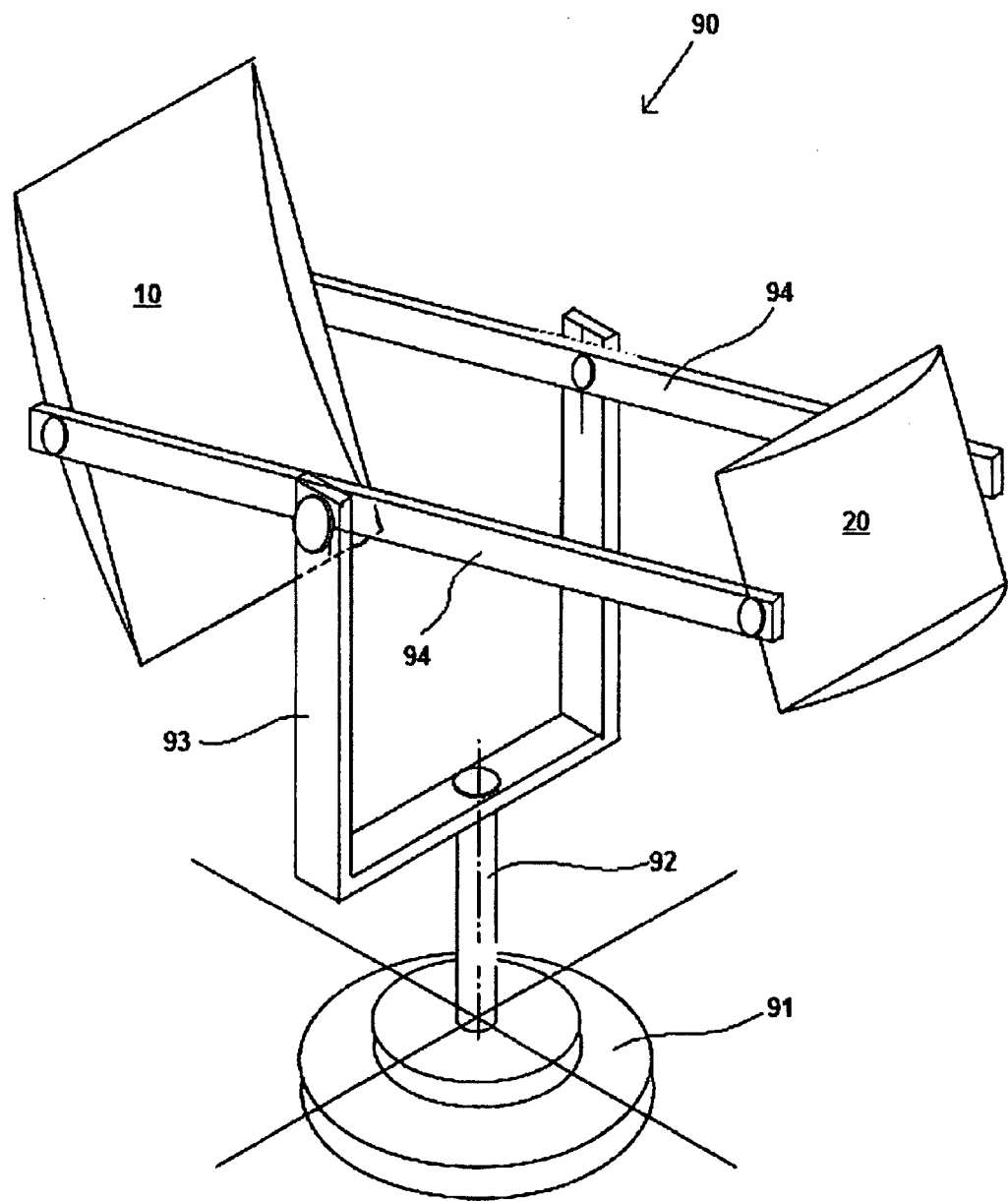
FIG. 9 is a top side elevational view of an exemplary cigarette lighter using the two-stage solar concentrating system according to the present invention.

For purposes of exemplification two applications of the two-stage solar concentrating system are illustrated in FIGS. 8 and 9 and should not be construed as restrictive in any way. FIG. 8 shows an exemplary application of the two-stage solar concentrating system mounted on a barge to allow tracking the sun through the day and concentrating the solar radiation to a target area (35). A primary single-curved mirror (10) is mounted on the barge (80) through legs (81). A secondary single-curved mirror (20) is operably connected to the first single-curved mirror (10) by one or more struts (82). The struts may be attached directly to the barge and/or to the primary mirror, preferably by means of a hinge mount (28). The struts are provided at each end thereof with means to allow tilting and movement of the mirrors. Preferably, but not limited to, the mirrors are hingedly attached to the struts. In addition, means for adjusting the relative position of the struts with respect to the barge may be provided. Preferably, a sliding mechanism (83) may be provided to allow horizontal movement of the struts with respect to the barge. Solar tracking means may also be employed. The position adjusting means and/or the solar tracking means may comprise wedges, hinges, castors, rails, bearings, foundation mounts, etc. and may be actuated manually or by electric or hydraulic apparatus and associated control devices.

FIG. 9 shows another exemplary application of the two-stage solar concentrating system. In particular, FIG. 9 shows a cigarette lighter (90) constructed according to the two-stage solar concentrating system disclosed herein. The cigarette lighter (90) may have a pedestal (91) as a base for a pillar (92). The pillar (92) may be provided with a U-shaped structure (93) having attached at the two ends thereof a horizontal arm (94) to which at least one primary mirror and at least one secondary mirror may be mounted in accordance with the present invention. The cigarette lighter as described above may further comprise means for adjusting the relative position of the single-curved mirrors (10, 20) as well as means for retaining the mirrors into a desired position with a view to capturing solar radiation and concentrating the radiation to an area so as to cause ignition.

Various modifications to the disclosed embodiments will be readily apparent to those skilled in the art or science, and the general principles defined herein may be applied to other embodiments and applications without departing from the spirit and scope of the invention. Thus, the present invention is not intended to be limited to the embodiments disclosed, but is to be accorded the widest scope consistent with the principles and features disclosed herein. Accordingly, the principle of concentration and collection of solar energy remain the same, only that is suitably chosen in accordance with the end application.

The aforesaid description and drawings presented herein teach in considerable detail workable embodiments within the broad concept of the present invention. However, it is particularly noted that the inventor has as a result of his experimental activity, testing and further general development, arrived at possible additional and alternative working structures, the specific operational details will be readily discernible by a man skilled in the art.

Figure 10:
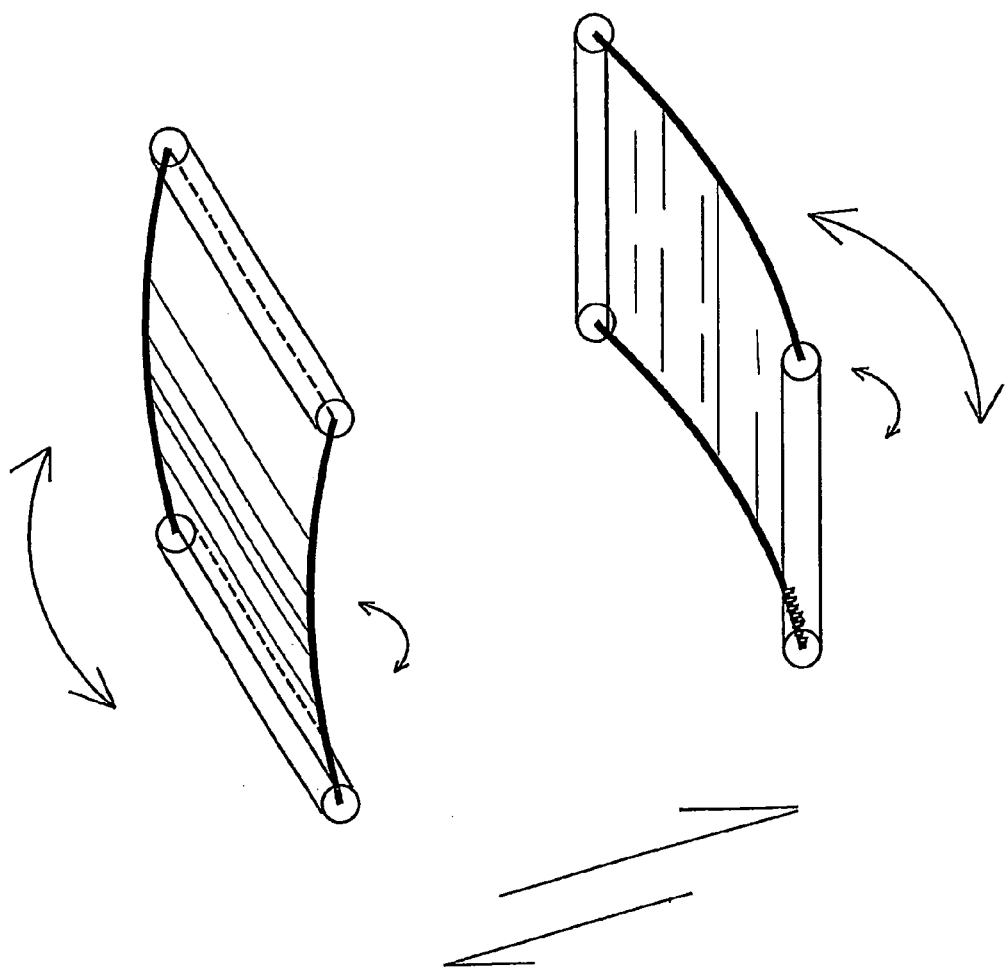
FIG. 10 is a representation of two reflective surfaces arranged in accordance with an embodiment of the present invention.

FIG. 10 shows separate reflective surfaces arranged in relative angles and separation to concentrate incoming solar radiation to a point.

Figure 11:
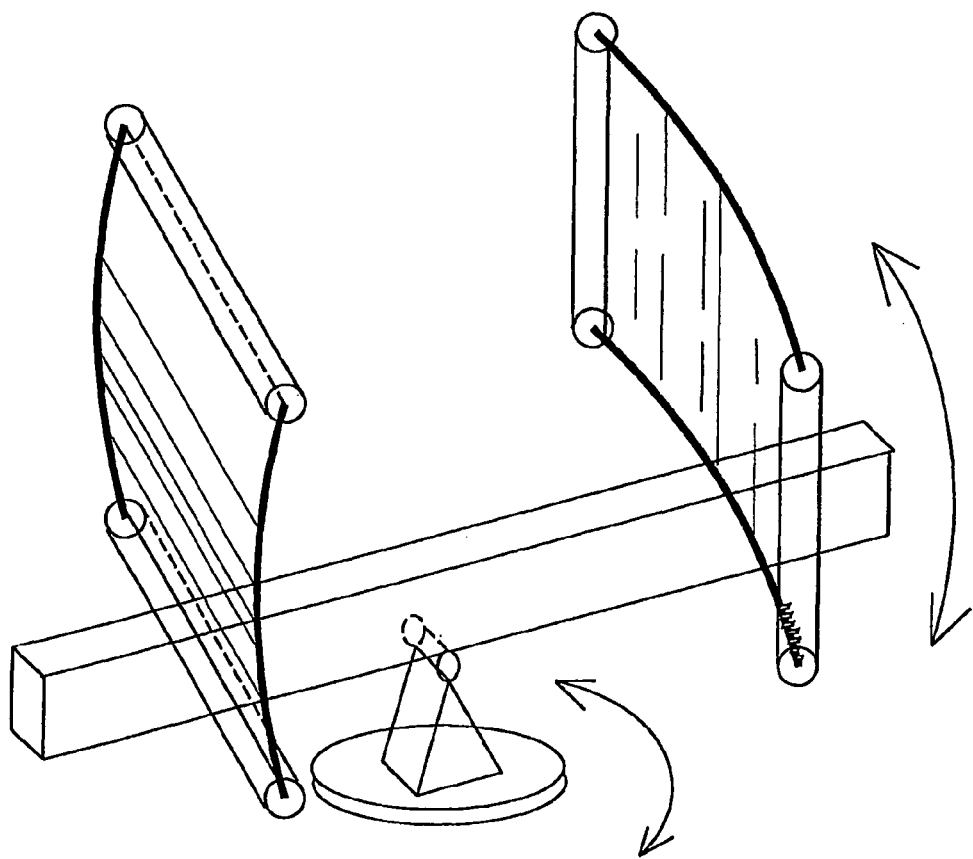
FIGS. 11 to 16 show separate reflective surfaces attached to a connecting structure in accordance with several embodiments of the present invention.

FIG. 11 shows separate reflective surfaces fixed to a connecting structure that is arranged to rotate and tilt so as to track the relative motion of the sun and concentrate its rays to a point.

Figure 12:
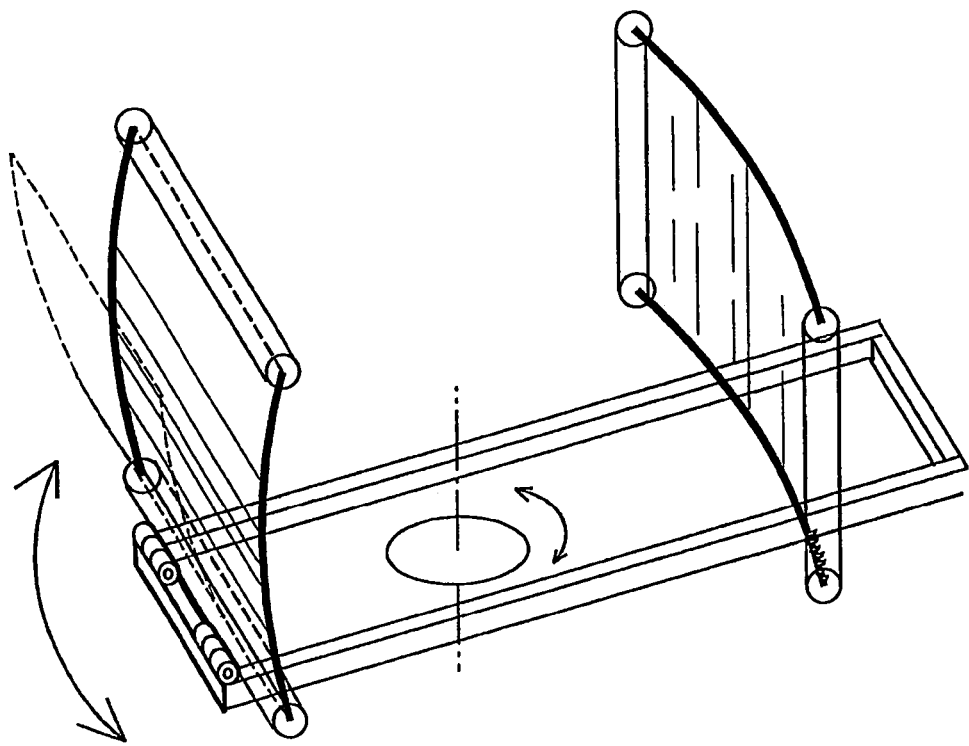

FIG. 12 shows separate reflective surfaces attached to a connecting structure that is arranged to rotate horizontally and where the first reflecting surface is hingedly connected and allowed to rotate vertically so as to track the relative motion of the sun and concentrate its rays to a point.

Figure 13:
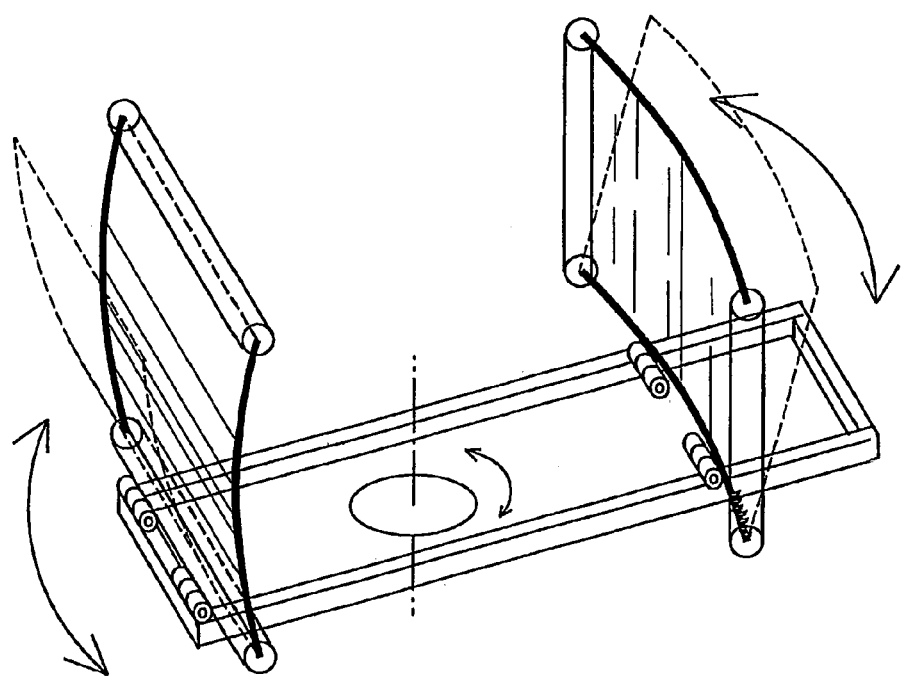

FIG. 13 shows separate reflective surfaces attached to a connecting structure that is arranged to rotate horizontally and where the first and second reflecting surfaces are hingedly connected and allowed to rotate vertically so as to track the relative motion of the sun and concentrate its rays to a point.

Figure 14:
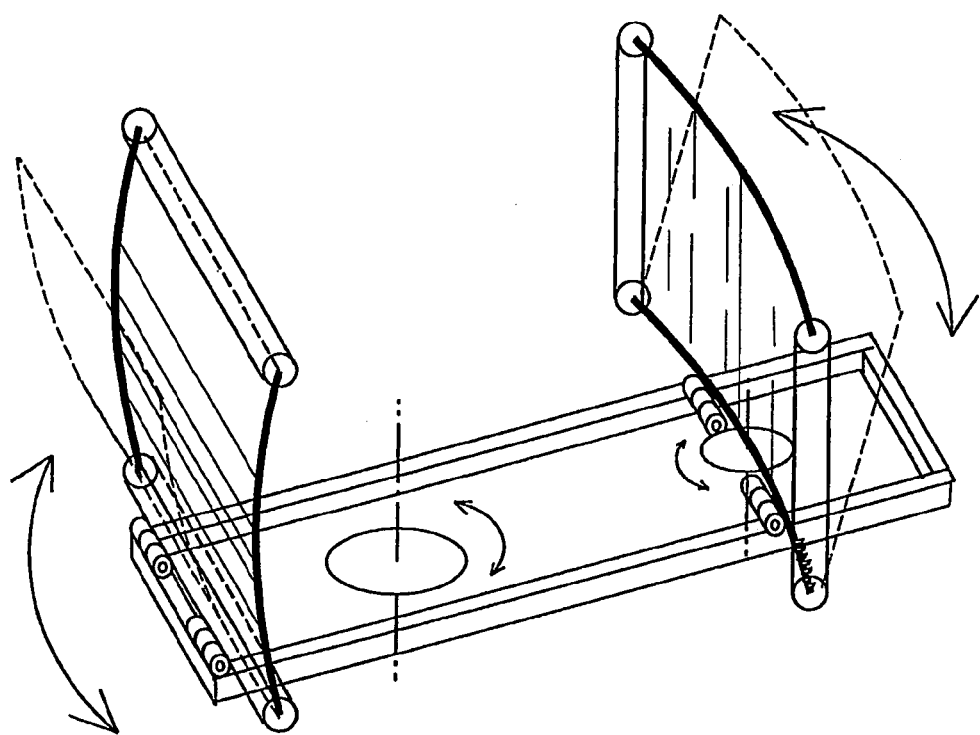

FIG. 14 shows separate reflective surfaces attached to a connecting structure that is arranged to rotate horizontally and where the first and second reflecting surfaces are hingedly connected and allowed to rotate vertically and where the second reflective surface is also allowed to rotate horizontally so as to track the relative motion of the sun and concentrate its rays to a point.

Figure 15:
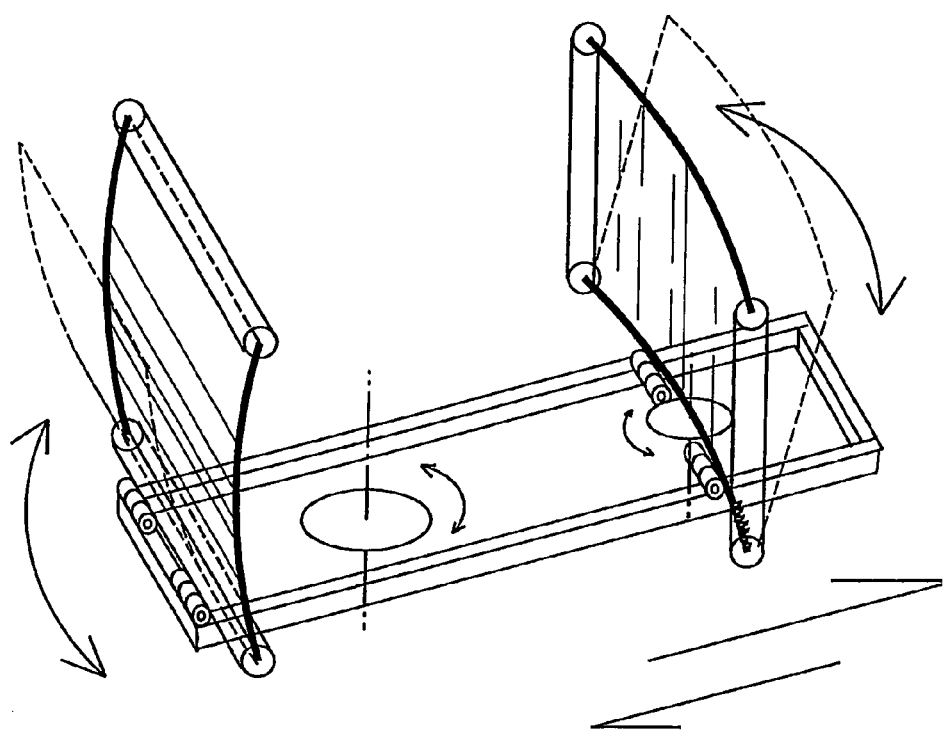

FIG. 15 shows separate reflective surfaces attached to a connecting structure that is arranged to rotate horizontally and where the first and second reflecting surfaces are hingedly connected and allowed to rotate vertically and where the second reflective surface is also allowed to rotate horizontally and to move along the connecting structure so its distance from the first reflective surface may be varied so as to track the relative motion of the sun and concentrate its rays to a point.

Figure 16:
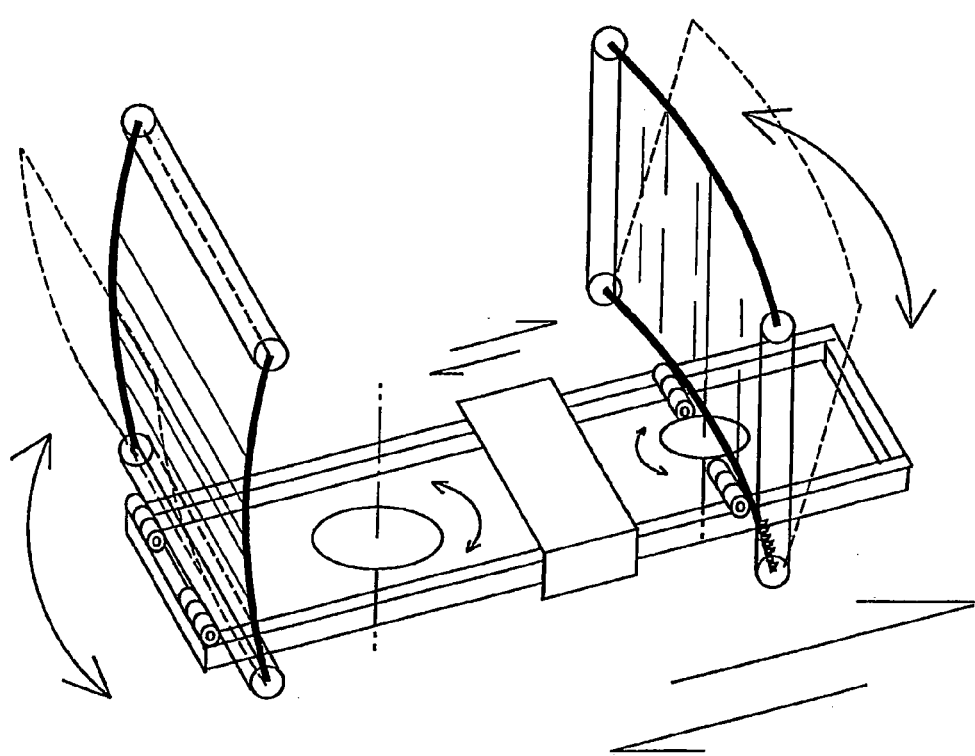

FIG. 16 shows separate reflective surfaces attached to a connecting structure that is arranged to rotate horizontally and where the first and second reflecting surfaces are hingedly connected and allowed to rotate vertically and where the second reflective surface is also allowed to rotate horizontally and to move along the connecting structure so its distance from the first reflective surface may be varied so as to track the relative motion of the sun and concentrate its rays to a point located on a carriage or platform which is allowed to move along the connecting structure so that its distance from the second reflective surface may be varied.

Figure 17:
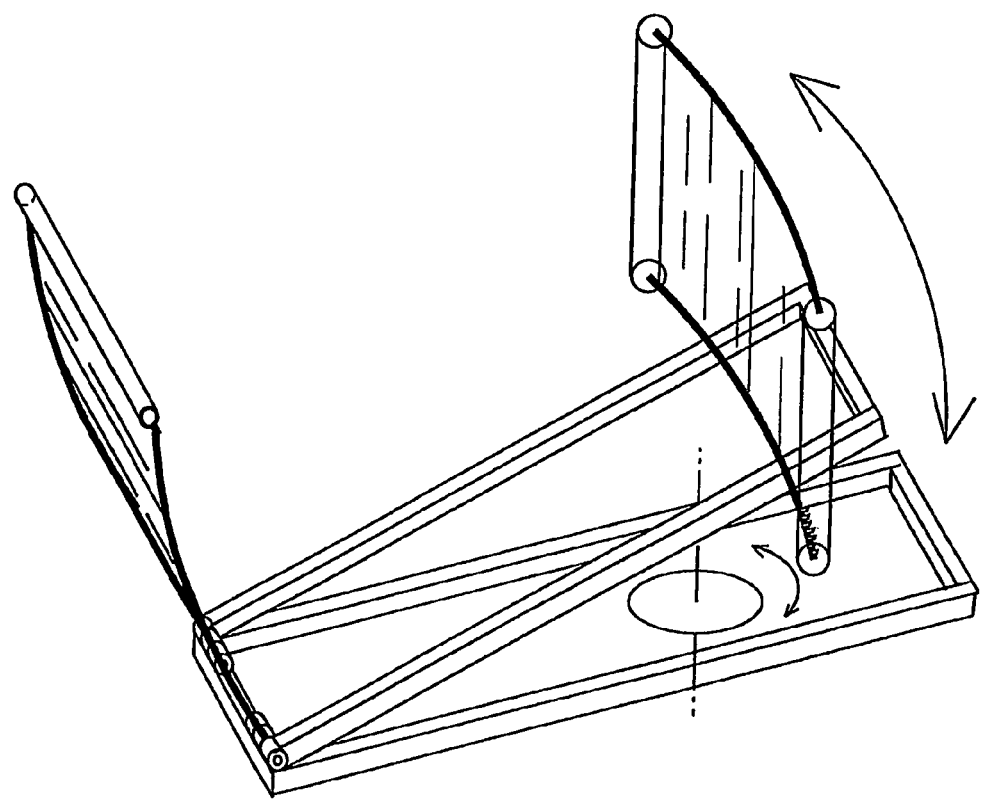
FIGS. 17 to 28 show separate reflective surfaces attached to a boom framework in accordance with another embodiment of the present invention.

FIG. 17 shows separate reflective surfaces fixed to a connecting structure (boom framework) that is arranged to tilt (vertically) from a base structure or framework which is able to rotate (horizontally) so as to track the relative motion of the sun and concentrate its rays to a point.

Figure 18:
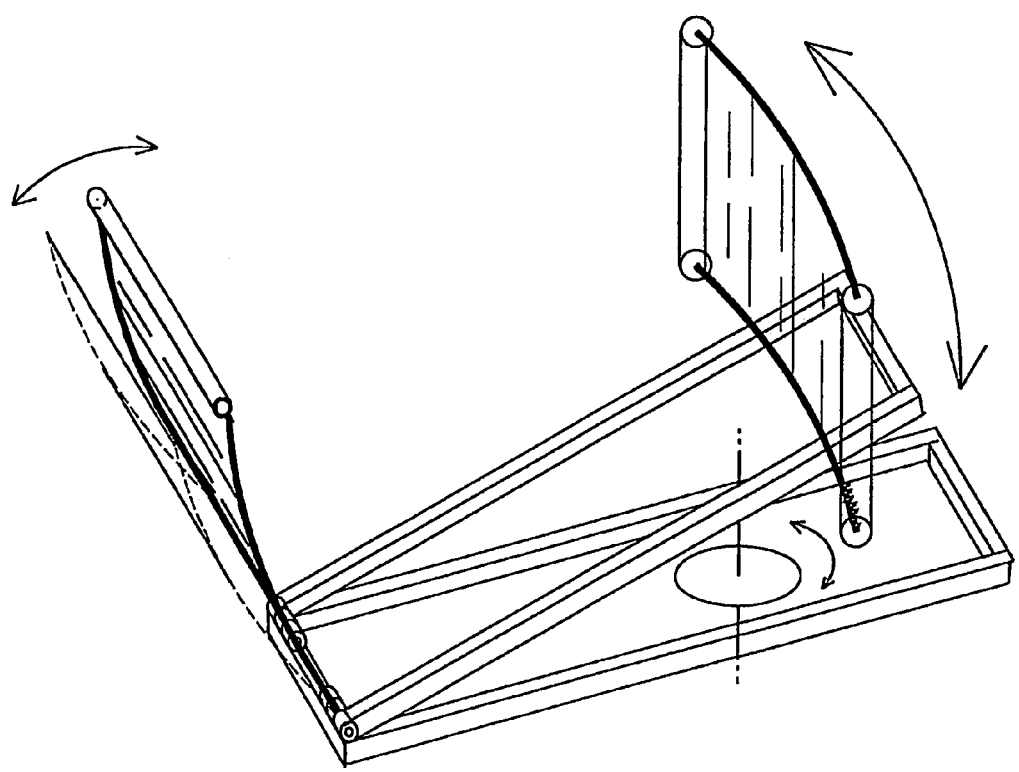

FIG. 18 shows separate reflective surfaces attached to a connecting structure (boom framework) that is arranged to tilt (vertically) from a base structure or framework which is able to rotate (horizontally) and where the first reflecting surface is hingedly connected so as to track the relative motion of the sun and concentrate its rays to a point.

Figure 19:
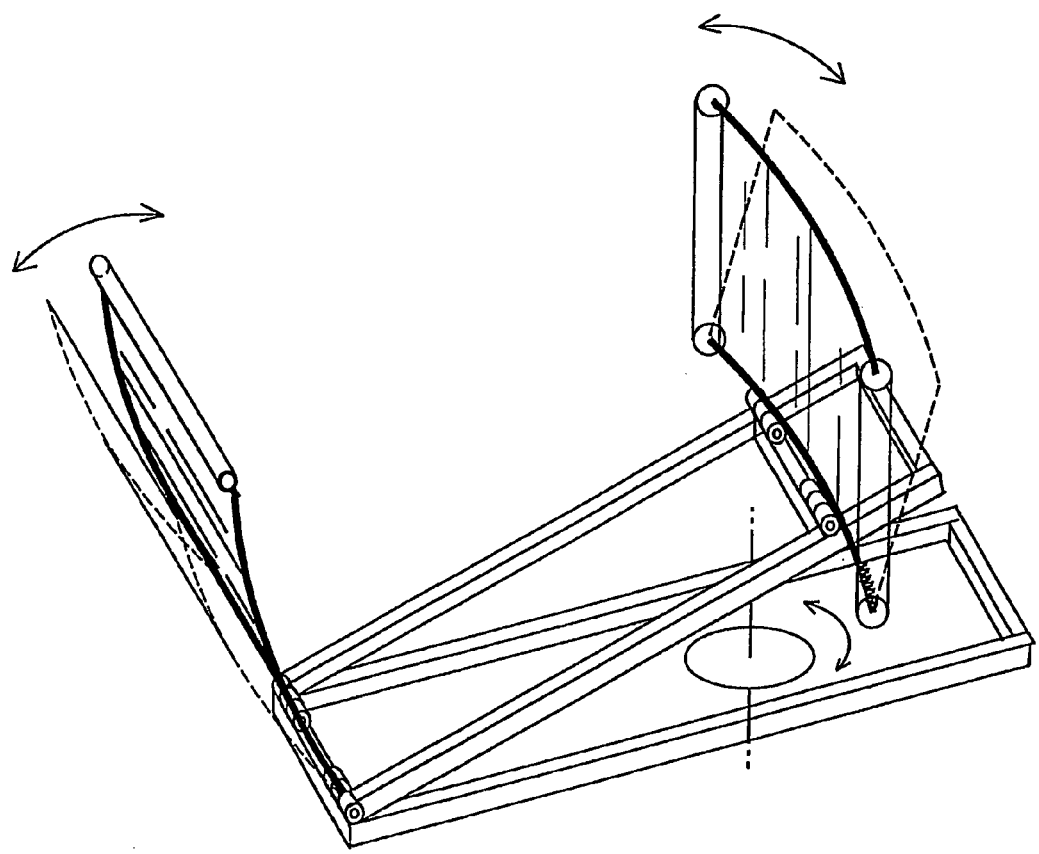

FIG. 19 shows separate reflective surfaces attached to a connecting structure (boom framework) that is arranged to tilt (vertically) from a base structure or framework which is able to rotate (horizontally) and where the first and second reflecting surfaces are hingedly connected so as to track the relative motion of the sun and concentrate its rays to a point.

Figure 20:
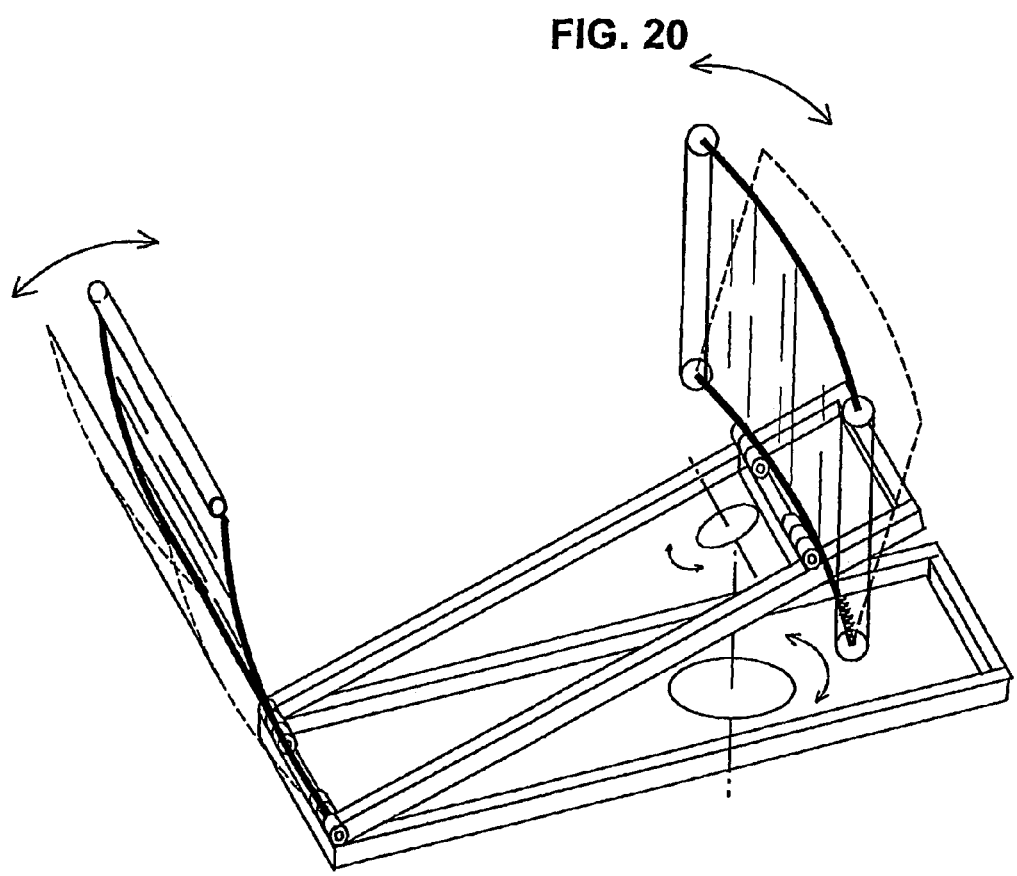

FIG. 20 shows separate reflective surfaces attached to a connecting structure (boom framework) that is arranged to tilt (vertically) from a base structure or framework which is able to rotate (horizontally) and where the first and second reflecting surfaces are hingedly connected and where the second reflective surface is also allowed to rotate (horizontally) so as to track the relative motion of the sun and concentrate its rays to a point.

Figure 21:
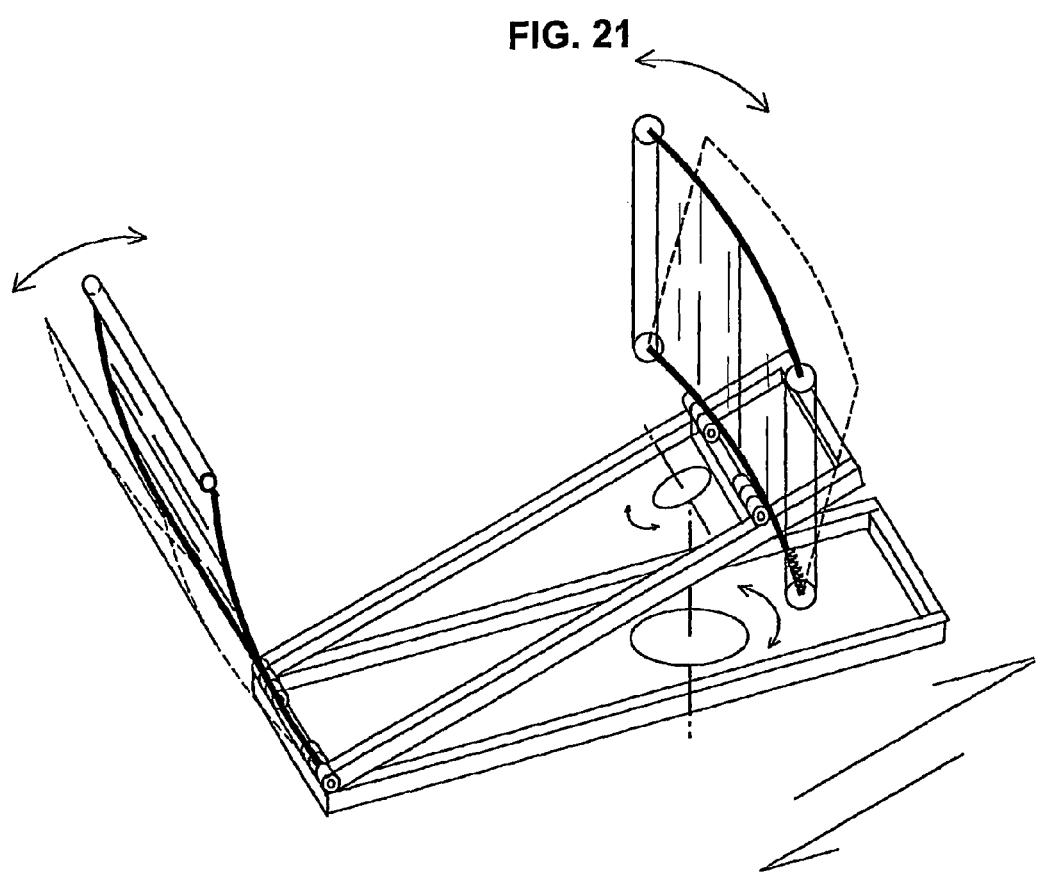

FIG. 21 shows separate reflective surfaces attached to a connecting structure (boom framework) that is arranged to tilt (vertically) from a base structure or framework which is able to rotate (horizontally) and where the first and second reflecting surfaces are hingedly connected and where the second reflective surface is also allowed to rotate (horizontally) and to move along the connecting structure so its distance from the first reflective surface may be varied so as to track the relative motion of the sun and concentrate its rays to a point.

Figure 22:
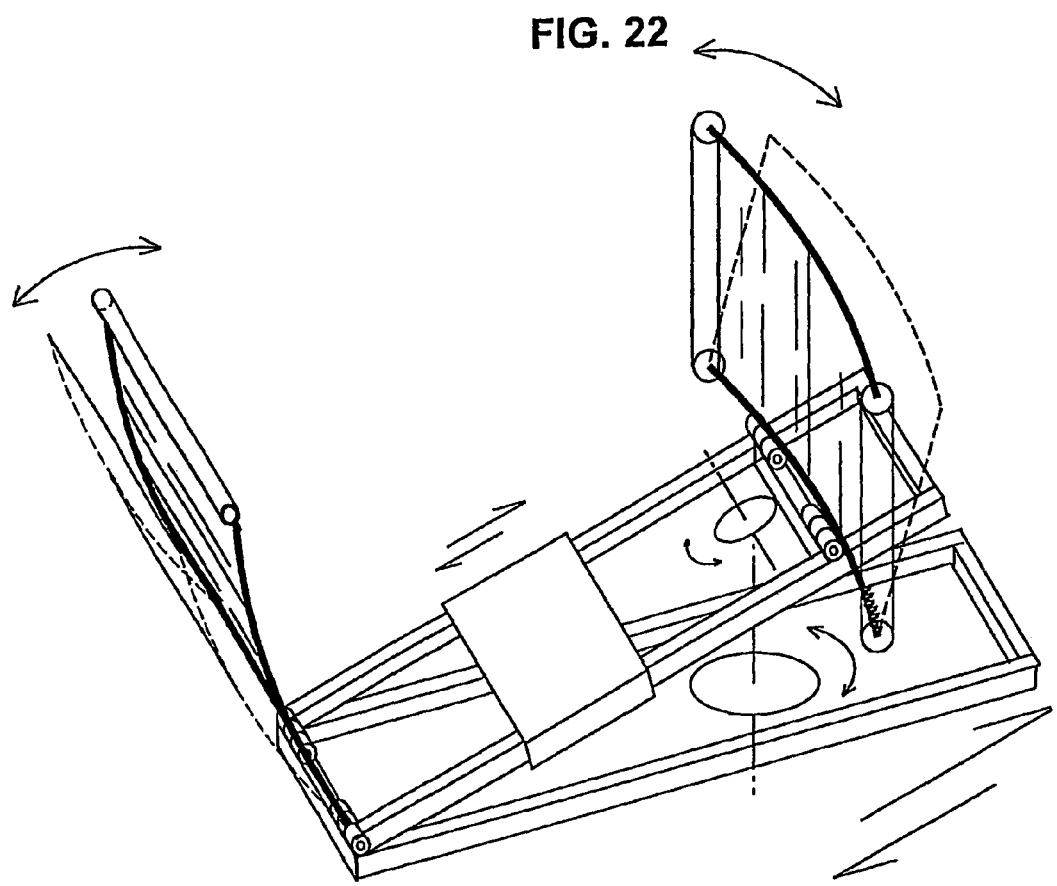

FIG. 22 shows separate reflective surfaces attached to a connecting structure (boom framework) that is arranged to tilt (vertically) from a base structure or framework which is able to rotate (horizontally) and where the first and second reflecting surfaces are hingedly connected and where the second reflective surface is also allowed to rotate (horizontally) and to move along the connecting structure so its distance from the first reflective surface may be varied so as to track the relative motion of the sun and concentrate its rays to a point located on a carriage or platform which is allowed to move along the connecting structure so that its distance from the second reflective surface may be varied.

Figure 23:
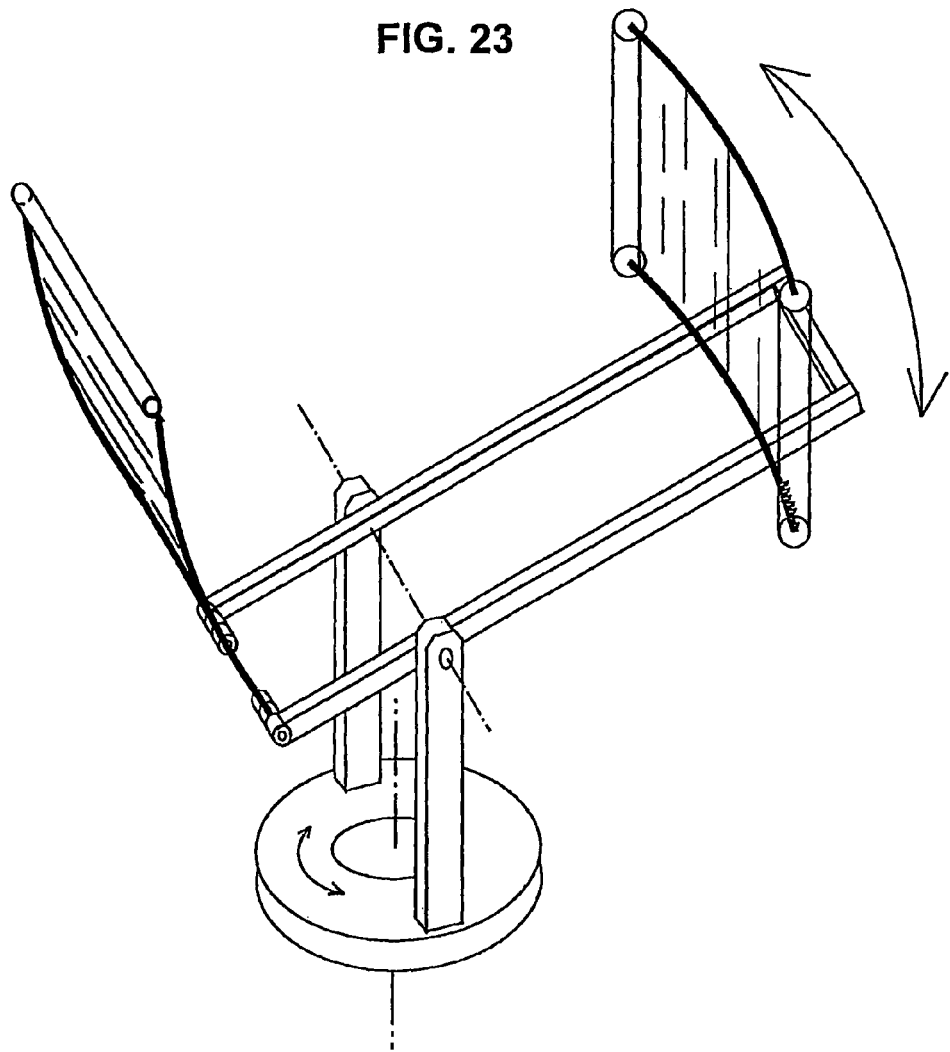

FIG. 23 shows separate reflective surfaces fixed to a connecting structure (boom framework) that is arranged to tilt (vertically) from a base structure or framework which is able to rotate (horizontally) so as to track the relative motion of the sun and concentrate its rays to a point.

Figure 24:
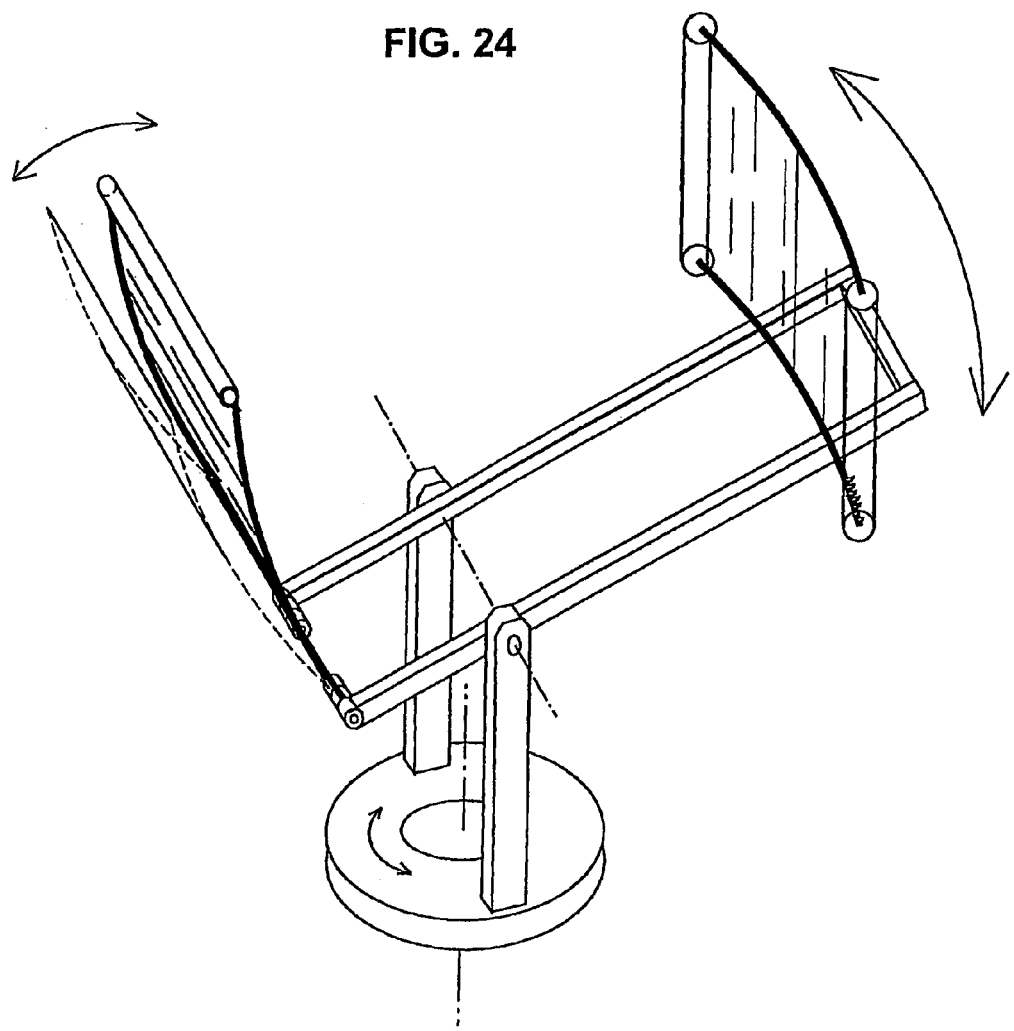

FIG. 24 shows separate reflective surfaces attached to a connecting structure (boom framework) that is arranged to tilt (vertically) from a base structure or framework which is able to rotate (horizontally) and where the first reflecting surface is hingedly connected so as to track the relative motion of the sun and concentrate its rays to a point.

Figure 25:
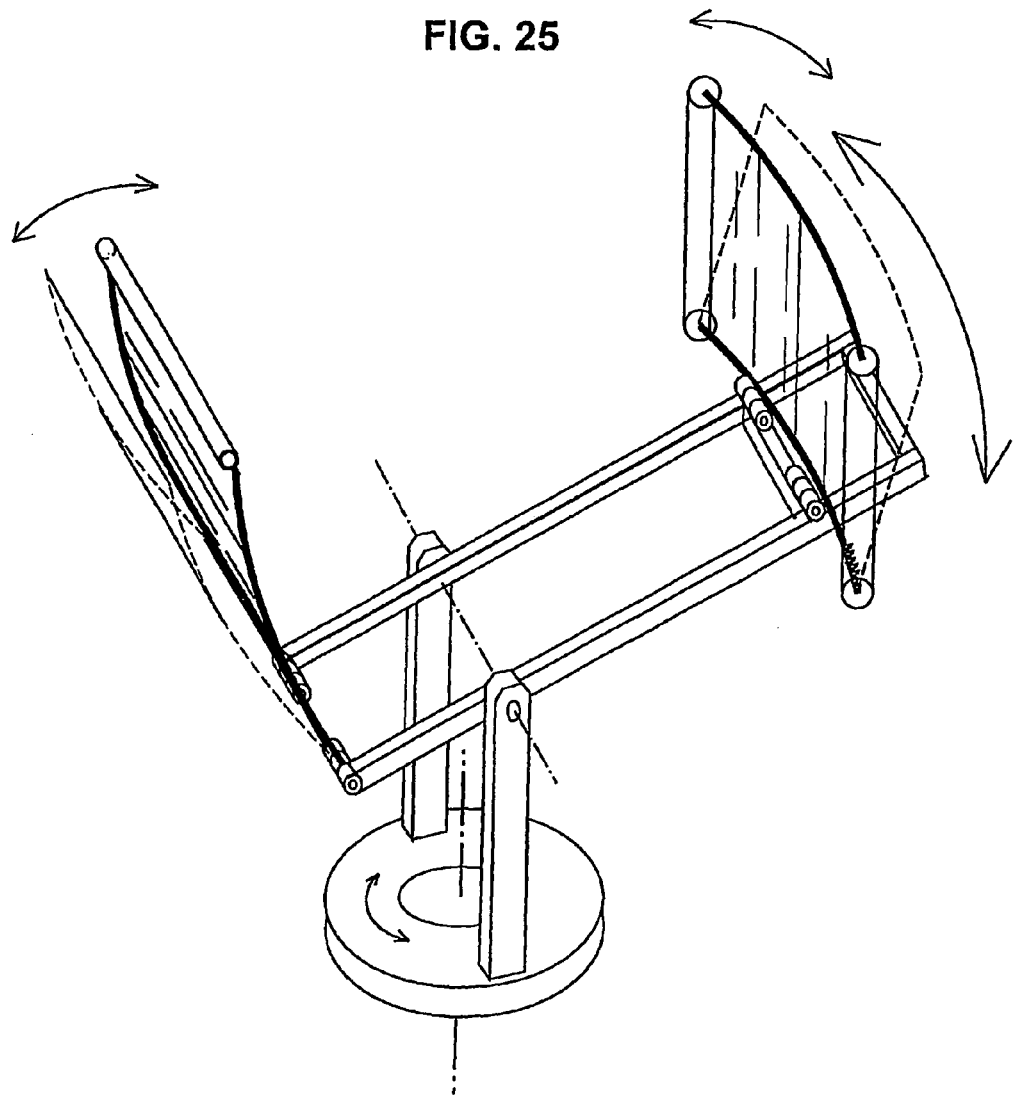

FIG. 25 shows separate reflective surfaces attached to a connecting structure (boom framework) that is arranged to tilt (vertically) from a base structure or framework which is able to rotate (horizontally) and where the first and second reflecting surfaces are hingedly connected so as to track the relative motion of the sun and concentrate its rays to a point.

Figure 26:
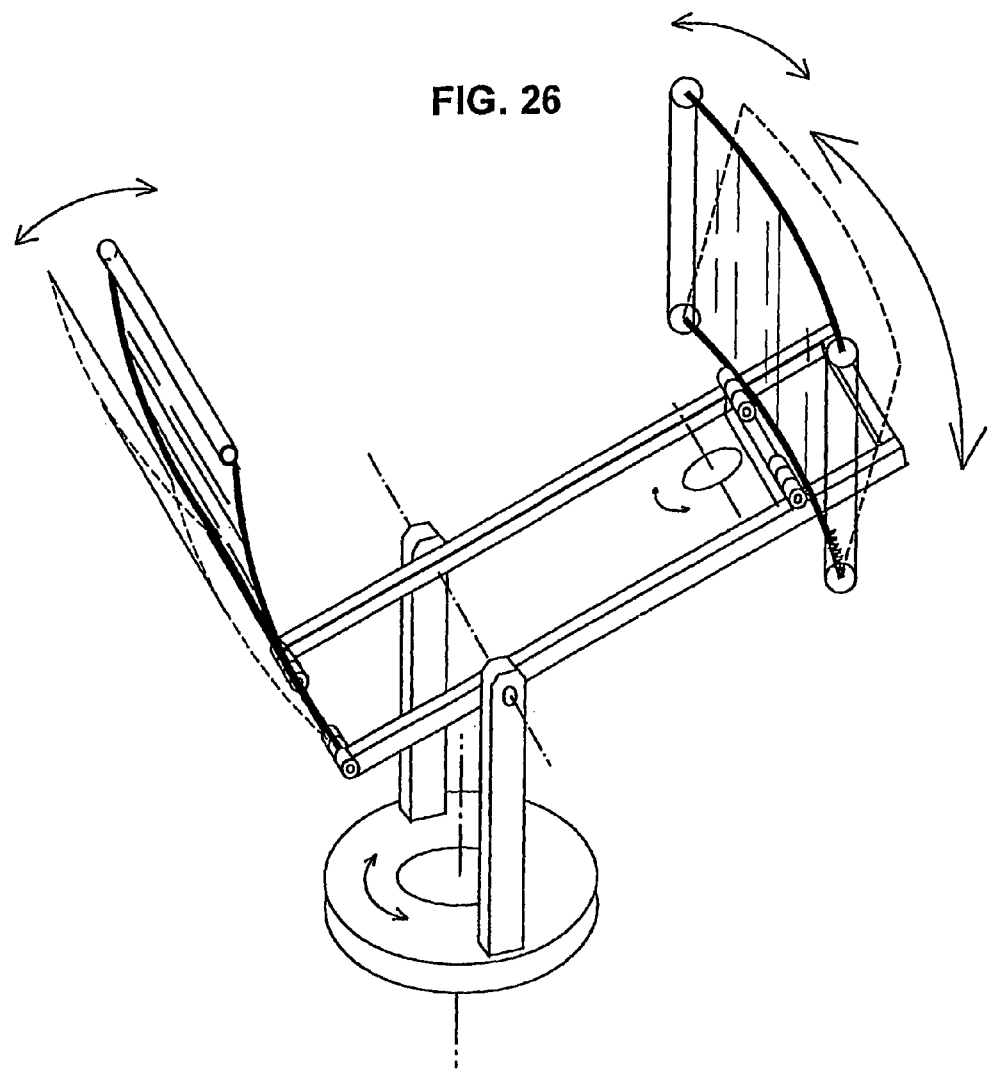

FIG. 26 shows separate reflective surfaces attached to a connecting structure (boom framework) that is arranged to tilt (vertically) from a base structure or framework which is able to rotate (horizontally) and where the first and second reflecting surfaces are hingedly connected and where the second reflective surface is also allowed to rotate (horizontally) so as to track the relative motion of the sun and concentrate its rays to a point.

Figure 27:
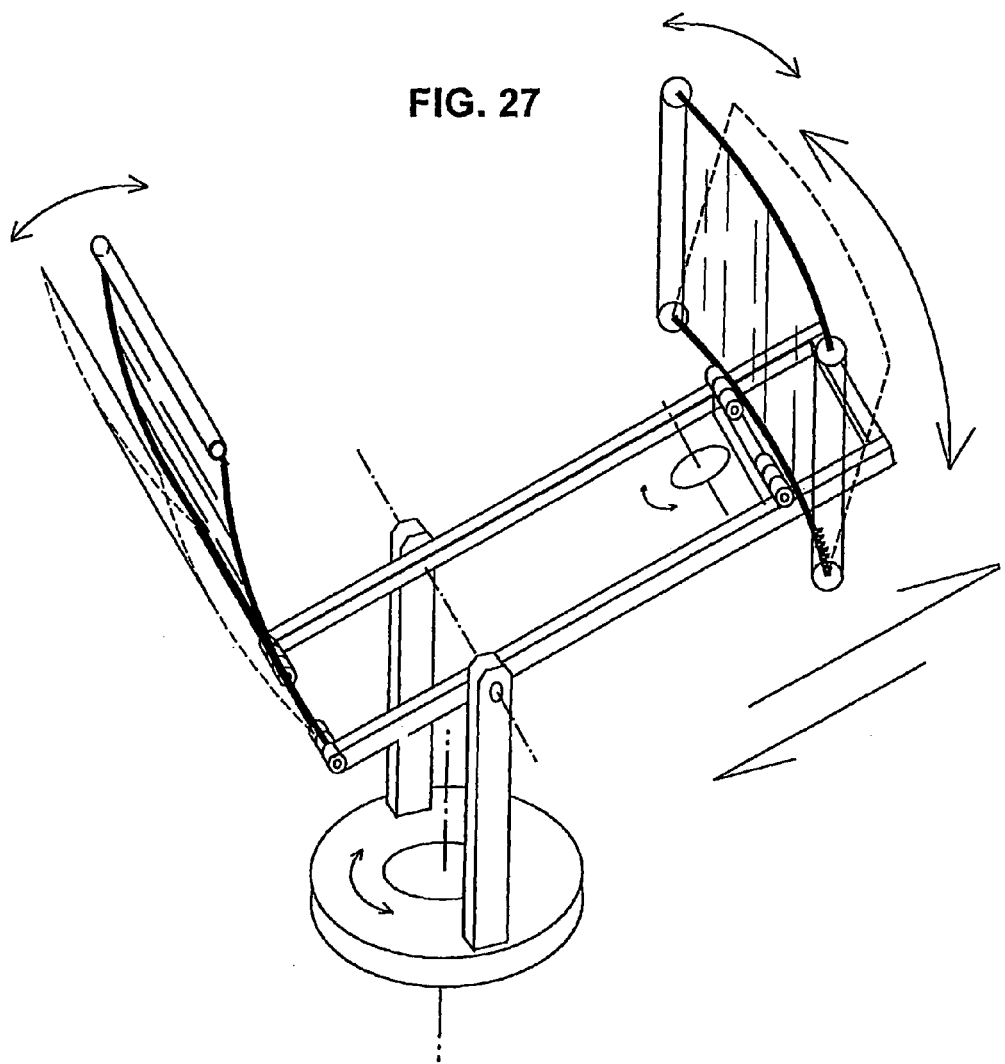

FIG. 27 shows separate reflective surfaces attached to a connecting structure (boom framework) that is arranged to tilt (vertically) from a base structure or framework which is able to rotate (horizontally) and where the first and second reflecting surfaces are hingedly connected and where the second reflective surface is also allowed to rotate (horizontally) and to move along the connecting structure so its distance from the first reflective surface may be varied so as to track the relative motion of the sun and concentrate its rays to a point.

Figure 28:
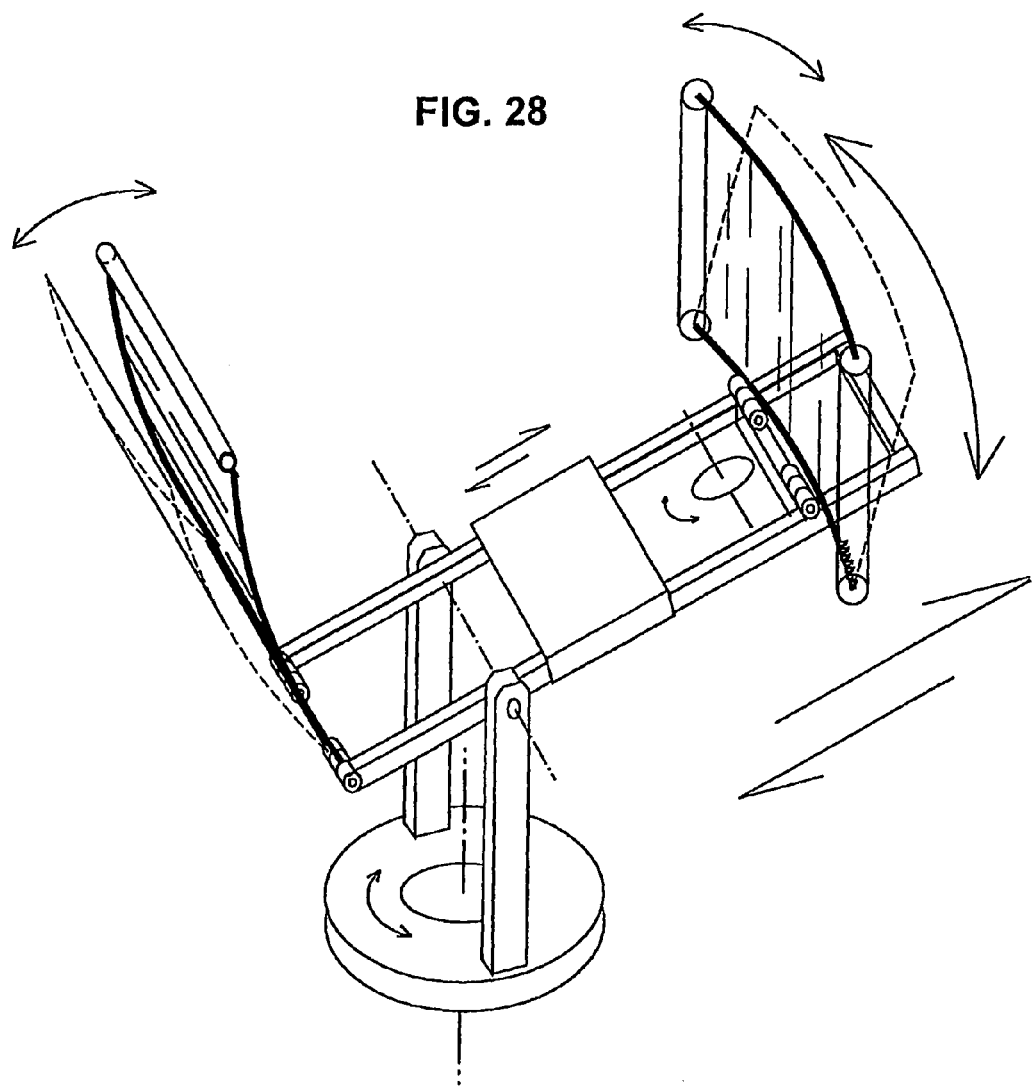

FIG. 28 shows separate surfaces attached to a connecting structure (boom framework) that is arranged to tilt (vertically) from a base structure or framework which is able to rotate (horizontally) and where the first and second reflecting surfaces are hingedly connected and where the second reflective surface is also allowed to rotate (horizontally) and to move along the connecting structure so its distance from the first reflective surface may be varied so as to track the relative motion of the sun and concentrate its rays to a point located on a carriage or platform which is allowed to move along the connecting structure so that its distance from the second reflective surface may be varied.

Figure 29:
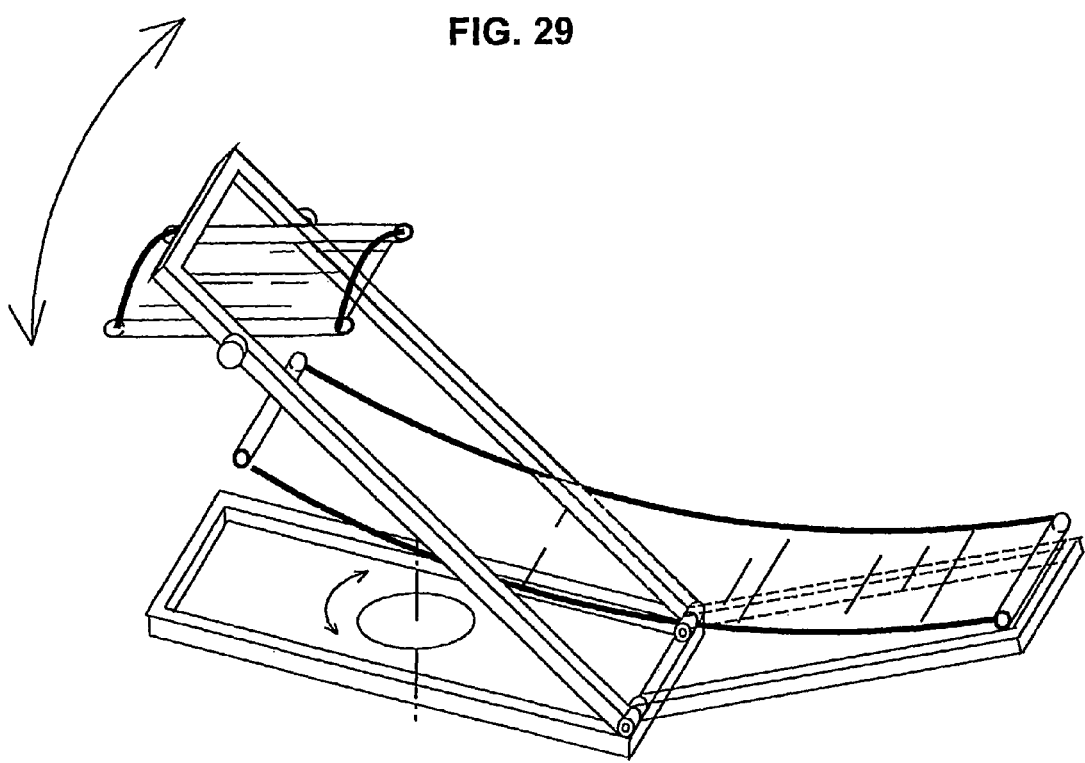
FIGS. 29 to 34 show separate reflective surfaces attached to a connecting structure in accordance with still another embodiment of the present invention.

FIG. 29 shows separate single curved reflective surfaces attached to a connecting structure with the first reflective surface attached to a base structure or framework which is able to rotate (horizontally) and a second reflective surface attached to a (boom framework) that is arranged to tilt (vertically) from the base so as to track the relative motion of the sun and concentrate its rays to a point.

Figure 30:
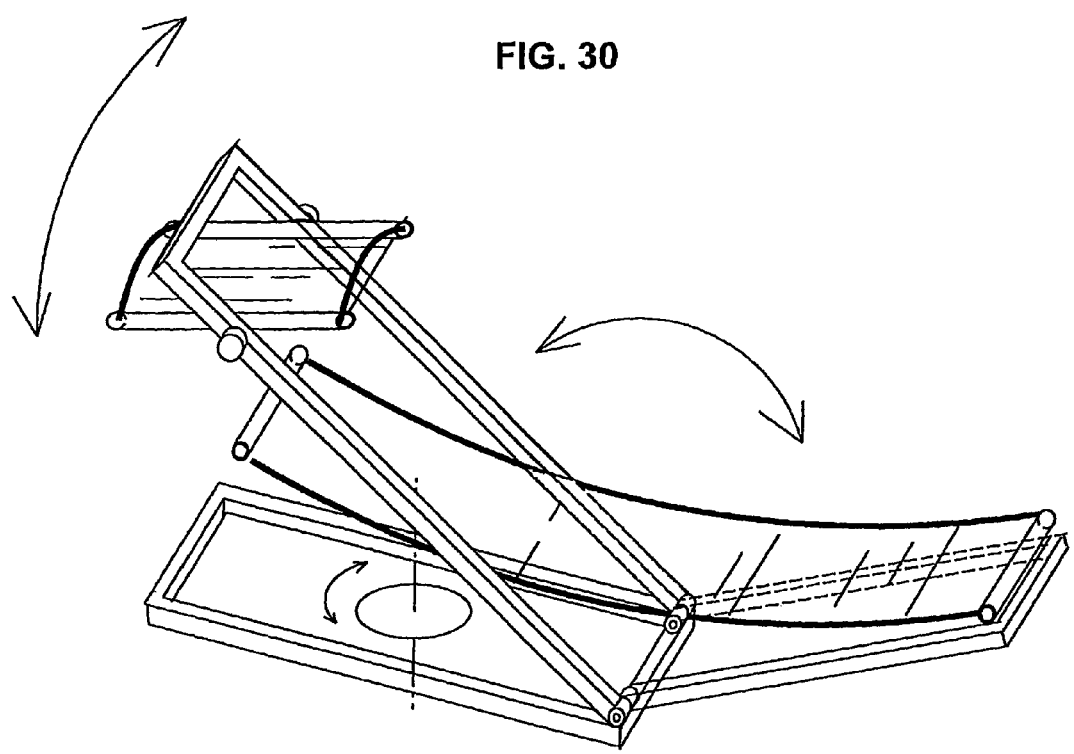

FIG. 30 shows separate single curved reflective surfaces attached to a connecting structure with the first reflective surface attached to a base structure or framework which is able to rotate (horizontally) where the first reflective surface is able to rotate about a transverse axis and a second reflective surface attached to a (boom framework) that is arranged to tilt (vertically) from the base so as to frack the relative motion of the sun and concentrate its rays to a point.

Figure 31:
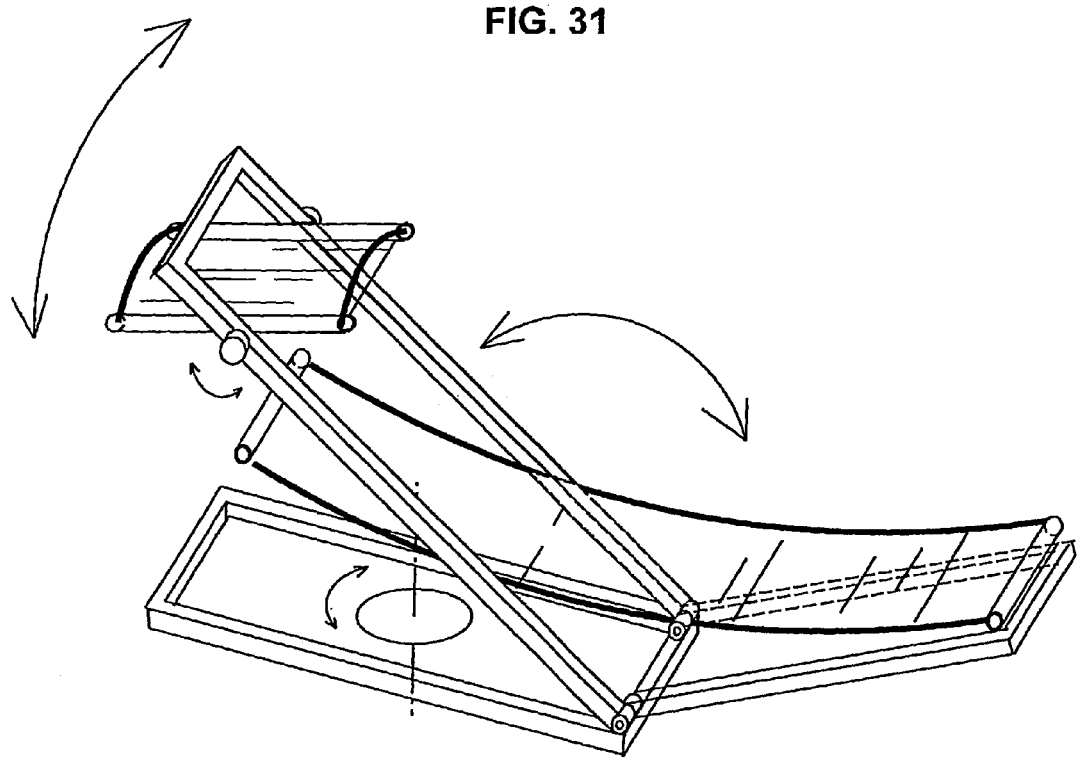

FIG. 31 shows separate single curved reflective surfaces attached to a connecting structure with the first reflective surface attached to a base structure or framework which is able to rotate (horizontally) where the first reflective surface is able to rotate about a transverse axis and a second reflective surface attached to a (boom framework) that is arranged to tilt (vertically) from the base and where the second reflective surface is able to rotate about a transverse axis so as to track the relative motion of the sun and concentrate its rays to a point.

Figure 32:
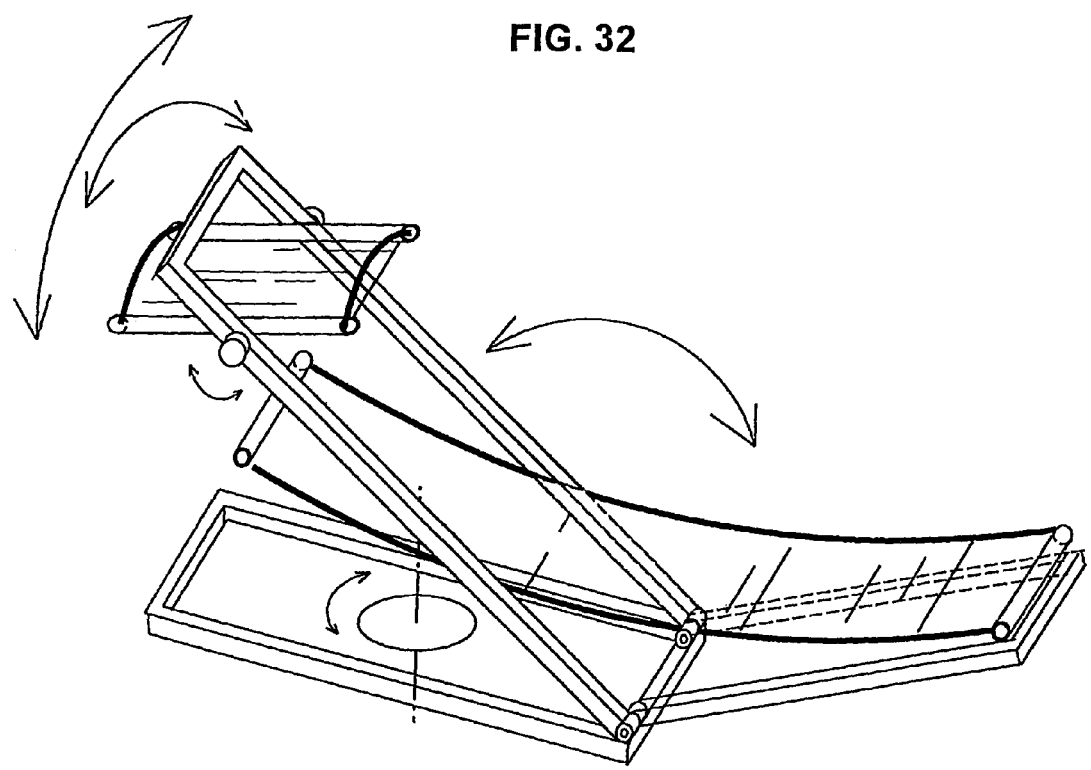

FIG. 32 shows separate single curved reflective surfaces attached to a connecting structure with the first reflective surface attached to a base structure or framework which is able to rotate (horizontally) where the first reflective surface is able to rotate about a transverse axis and a second reflective surface attached to a (boom framework) that is arranged to tilt (vertically) from the base and where the second reflective surface is able to rotate about a transverse axis and a longitudinal axis so as to track the relative motion of the sun and concentrate its rays to a point.

Figure 33:
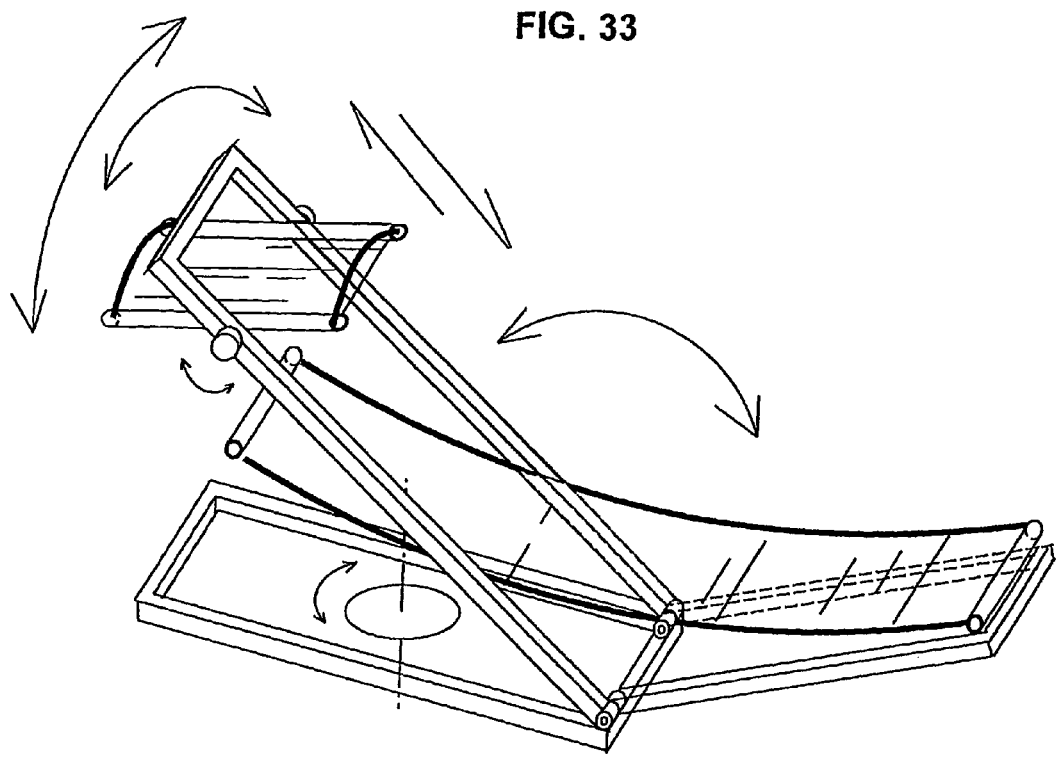

FIG. 33 shows separate single curved reflective surfaces attached to a connecting structure with the first reflective surface attached to a base structure or framework which is able to rotate (horizontally) where the first reflective surface is able to rotate about a transverse axis and a second reflective surface attached to a (boom framework) that is arranged to tilt (vertically) from the base and where the second reflective surface is able to rotate about a transverse axis and a longitudinal axis and to move along the connecting structure so its distance from the first reflective surface may be varied so as to track the relative motion of the sun and concentrate its rays to a point.

Figure 34:
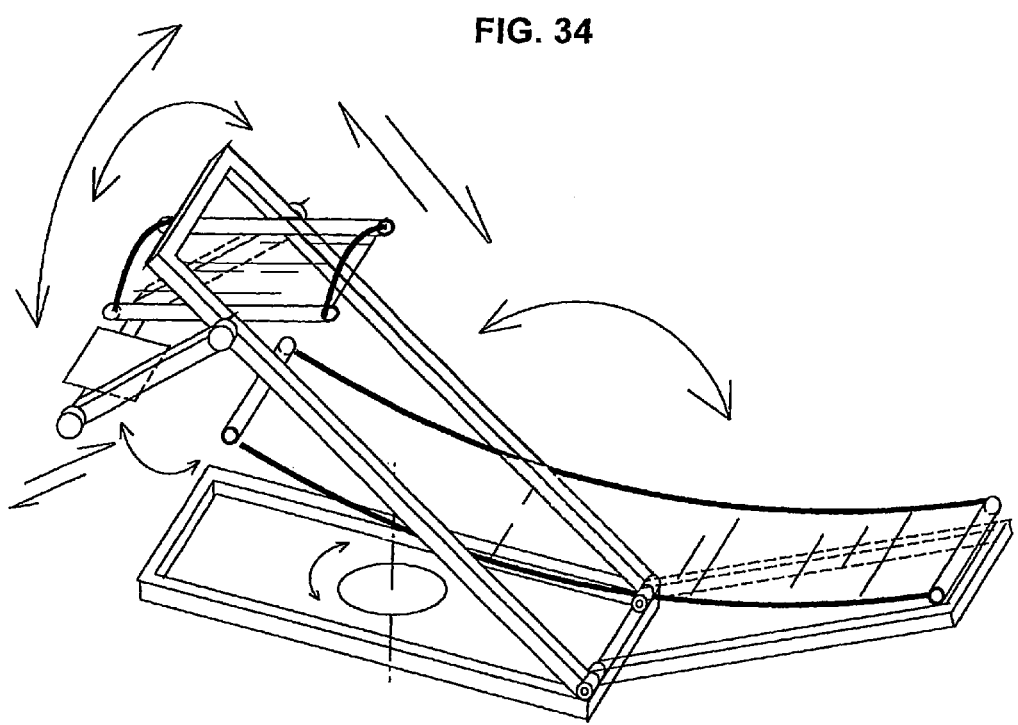

FIG. 34 shows separate single curved reflective surfaces attached to a connecting structure with the first reflective surface attached to a base structure or framework which is able to rotate (horizontally) where the first reflective surface is able to rotate about a transverse axis and a second reflective surface attached to a (boom framework) that is arranged to tilt (vertically) from the base and where the second reflective surface is able to rotate about a transverse axis and a longitudinal axis and to move along the connecting structure so its distance from the first reflective surface may be varied so as to track the relative motion of the sun and concentrate its rays to a point located on a platform which is allowed to move relative to the connecting structure so that its distance from the second reflective surface may be varied.

Accordingly, the embodiments listed on the following 25 sheets of drawings which include written footnotes to the drawings identifying the subject matter thereof are presented as alternative embodiments which are inextricably bound up in one and the same inventive concept as the embodiments previously taught herein.

INDUSTRIAL APPLICABILITY

The invention provides a solar concentrating system wherein the rays of sun may be reflected and concentrated to a desired focus. The solar concentrator may be used to increase the temperature of substance such as, for example, metal, for use in a variety of application including, e.g., melting of metals.

The embodiments of the present invention in which an exclusive property or privilege is claimed are defined as follows:

1. A solar radiation concentrating system comprising:
   first and second single-curved reflective surfaces, and
   a mounting structure associated with the first and second single-curved reflective surfaces, the mounting structure being so positioned and arranged as to selectively cause variance of a position of the first and second single-curved reflective surfaces with the principal plane of symmetry of the first single-curved reflective surface being positioned substantially orthogonal to the principal plane of symmetry of the second single-curved reflective surface so as to produce a substantially coincident point focus.

2. The solar radiation concentrating system of claim 1, wherein
   the mounting structure is so positioned and arranged as to selectively cause variance in the position of angles between the first and second reflective surfaces as well as pan and tilt angles of the first and second reflective surfaces whereby each of the first and second single-curved reflective surfaces is independently adjustable.

3. A solar radiation concentrating system according to claim 1, wherein the first reflective surface has a focal length greater than the focal length of the second reflective surface and wherein the reflective surfaces are arranged so as to produce substantially a coincident point focus.

4. A solar radiation concentrating system according to claim 1, wherein the first and second reflective surfaces are parabolic cylinders.

5. A solar radiation concentrating system according to claim 1, further comprising a support frame.

6. A solar radiation concentrating system according to claim 5, wherein the support frame comprises means for accommodating the reflecting surface, means for changing the curvature of the reflective surface, or both thereof.

7. A solar radiation concentrating system according to claim 1, wherein the first and second single-curved reflective surfaces are made from polished stainless steel, polished aluminum, mirrored glass, silvered PVC, silvered Mylar™ sheets, laminations or combinations thereof.

8. A solar radiation concentrating system according to claim 1, wherein the mounting structure further comprises:
 a support member for each reflective surface, wherein the support member is provided with tilting means to adjust its tilt angle.

9. A solar radiation concentrating system according to claim 8, further comprising a tilt angle adjusting means and a folding and deploying means.

10. A solar radiation concentrating system according to claim 1, further comprising solar tracking means for tracking the sun and maintaining a focus on a desired position.

11. A solar radiation concentrating system comprising:
 at least one first single-curved reflective surface and at least one second single-curved reflective surface; the system including:
  a mounting structure associated with the at least one first and second reflective surface, the mounting structure comprising:
  a platform; and
  a primary and secondary boom in operable association with the platform, wherein the primary boom and the secondary boom are in operable attachment to each other and whereby the angle between the primary and secondary boom may be selectively varied and wherein the principal plane of symmetry of the at least one first single-curved reflective surface is arranged substantially orthogonal to the principal plane of symmetry of the at least one second single-curved reflective surface so as to produce a substantially coincident point focus.

12. The solar radiation concentrating system according to claim 11, wherein the mounting structure selectively causes variance of the position of the angles between the first and second reflective surfaces as well as the pan and tilt angles of the first and second reflective surfaces so that each of the first and second single-curved reflective surfaces is independently adjustable.

13. A method for concentrating radiation to a coincident focus comprising reflecting an incident radiation off a first single-curved reflective surface onto a second single-curved reflective surface, wherein the principal plane of symmetry of the first single-curved reflective surface is arranged substantially orthogonal to the principal plane of symmetry of the second single-curved reflective surface, whereby the second single-curved reflective surface concentrates the incident radiation to a focus and wherein the first and second reflective surfaces are interconnected by a mounting structure; wherein the mounting structure comprises:
 a platform or base; and
 a primary boom and secondary boom operably associated with the platform and the first and second single-curved reflective surface, wherein the primary boom and the secondary boom are in operable attachment, whereby the angles between the primary and secondary boom, and platform may be selectively varied.

14. The method according to claim 13, wherein the first and second single-curved reflective surfaces are parabolic cylinders.

15. A method for concentrating radiation to a substantially rectangular, cross sectional area comprising reflecting an incident radiation off a first single-curved reflective surface onto a second single-curved reflective surface, wherein the principal plane of symmetry of the first single-curved reflective surface is arranged substantially orthogonal to the principal plane of symmetry of the second single-curved reflective surface, whereby the second single-curved reflective surface concentrates the incident radiation to a focus and wherein the substantially rectangular, cross sectional area is defined by a plane orthogonal to the principal axis of the second single-curved reflective surface at an intermediate point between a vertex and the focus of the second reflective surface and wherein the first and second reflective surfaces are interconnected by a mounting structure the mounting structure comprising:
 a platform or base; and
 a primary boom and secondary boom operably associated with the platform and the first and second single-curved reflective surface, wherein the primary boom and the secondary boom are in operable attachment, whereby the angles between the primary and secondary boom, and platform may be selectively varied.

16. A method for concentrating radiation to a substantially rectangular, cross sectional area comprising reflecting an incident radiation off a first single-curved reflective surface onto a second single-curved reflective surface, wherein the principal plane of symmetry of the first single-curved reflective surface is arranged substantially orthogonal to the principal plane of symmetry of the second single-curved reflective surface, whereby the second single-curved reflective surface concentrates the incident radiation to a focus and wherein the substantially rectangular, cross sectional area is defined by a plane orthogonal to the principal axis of the second single-curved reflective surface at a point situated after the focus of the second reflective surface and wherein the first and second reflective surfaces are interconnected by a mounting structure the mounting structure comprising:
 a platform or base; and
 a primary boom and secondary boom operably associated with the platform and the first and second single-curved reflective surface, wherein the primary boom and the secondary boom are in operable attachment, whereby the angles between the primary and secondary boom, and platform may be selectively varied.

17. A method for concentrating radiation to a coincident focus comprising reflecting an incident radiation off a first single-curved reflective surface onto a second single-curved reflective surface, wherein the principal plane of symmetry of the first single-curved reflective surface is arranged substantially orthogonal to the principal plane of symmetry of the second single-curved reflective surface, whereby the second single-curved reflective surface concentrates the incident radiation to a focus and wherein the first and second reflective surfaces are interconnected by a mounting structure, wherein the mounting structure selectively causes variance of the position of the angles between the first and second reflective surfaces as well as the pan and tilt angles of the first and second reflective surfaces so that each of the first and second single-curved reflective surfaces is independently adjustable.

* * * * *

UNITED STATES PATENT AND TRADEMARK OFFICE
CERTIFICATE OF CORRECTION

PATENT NO. : 8,471,187 B2 Page 1 of 1
APPLICATION NO. : 12/294600
DATED : June 25, 2013
INVENTOR(S) : Peter J. Kinley It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1098 days.

Signed and Sealed this
Eighth Day of September, 2015

Michelle K. Lee
*Director of the United States Patent and Trademark Office*